United States Patent
Bokhan-Dilawari et al.

(10) Patent No.: US 12,517,907 B2
(45) Date of Patent: Jan. 6, 2026

(54) GRAPH-BASED QUERY ENGINE FOR AN EXTENSIBILITY PLATFORM

(71) Applicant: Cisco Technology, Inc., San Jose, CA (US)

(72) Inventors: Anna Igorevna Bokhan-Dilawari, San Ramon, CA (US); Martin Mares, Prague (CZ); Vojtěch Mucha, Prague (CZ); Martin Hvizdoš, Prague (CZ); Marek Timr, Prague (CZ); Štěpán Vávra, Prague (CZ)

(73) Assignee: Cisco Technology, Inc., San Jose, CA (US)

( * ) Notice: Subject to any disclaimer, the term of this patent is extended or adjusted under 35 U.S.C. 154(b) by 62 days.

(21) Appl. No.: 18/126,850

(22) Filed: Mar. 27, 2023

(65) Prior Publication Data

US 2023/0315732 A1    Oct. 5, 2023

Related U.S. Application Data

(60) Provisional application No. 63/326,159, filed on Mar. 31, 2022.

(51) Int. Cl.
*G06F 16/2453* (2019.01)
*G06F 16/242* (2019.01)

(52) U.S. Cl.
CPC .... *G06F 16/24547* (2019.01); *G06F 16/2448* (2019.01)

(58) Field of Classification Search
CPC .............. G06F 16/24547; G06F 16/2448
See application file for complete search history.

(56) References Cited

U.S. PATENT DOCUMENTS 8,874,477 B2 * 10/2014 Hoffberg .............. G06Q 20/065
   705/37
9,710,430 B2    7/2017 Werner
(Continued)

FOREIGN PATENT DOCUMENTS

CN    103699824 A    4/2014

OTHER PUBLICATIONS

Abeysinghe, et al., "Cell-Based Architecture—A Decentralized Reference Architecture for Cloud-native Applications", online: https://github.com/wso2/reference-architecture/blob/master/reference-architecture-cell-based.md, winter 2022, 28 pages.
(Continued)

*Primary Examiner* — Miranda Le
(74) *Attorney, Agent, or Firm* — Lee & Hayes, P.C.; James M. Behmke

(57) ABSTRACT

In one embodiment, a method comprises: accessing information from an extensibility platform configured to monitor observability data from a monitored computer network topology; receiving a query regarding the information, the query formatted according to a unified query language for the extensibility platform; determining which specific requested data from the information to return in response to the query based on a fetch block within the query; determining one or more bounding blocks within the query that establish one or more boundaries on the query, wherein one of the one or more bounding blocks comprises a topology boundary block to define a specific topology of the monitored computer network topology, wherein the specific topology identifies one or more entities within the monitored computer network topology to which the query is specifically directed; and returning results of the query as defined by the requested data to return and limited to the specific topology.

15 Claims, 26 Drawing Sheets

(56) References Cited

U.S. PATENT DOCUMENTS

| | | | |
|---|---|---|---|
| 9,971,590 | B2 | 5/2018 | Hoff et al. |
| 10,148,506 | B1* | 12/2018 | Anburose ............ H04L 41/5006 |
| 10,333,820 | B1 | 6/2019 | Wang et al. |
| 10,838,714 | B2 | 11/2020 | Sanghvi et al. |
| 10,986,065 | B1 | 4/2021 | Farhangi et al. |
| 11,227,208 | B2* | 1/2022 | Oliner .................... G06N 20/00 |
| 11,258,797 | B2 | 2/2022 | Wilson et al. |
| 11,314,601 | B1 | 4/2022 | Natanzon et al. |
| 11,314,758 | B2* | 4/2022 | Marquardt .......... G06F 16/9038 |
| 11,321,196 | B1 | 5/2022 | Kobayashi et al. |
| 11,507,363 | B2 | 11/2022 | Totale et al. |
| 11,995,465 | B2* | 5/2024 | Singh ........................ G06F 9/50 |
| 2005/0050141 | A1 | 3/2005 | An et al. |
| 2008/0288465 | A1 | 11/2008 | Payton et al. |
| 2009/0177988 | A1 | 7/2009 | Martins |
| 2009/0183185 | A1 | 7/2009 | Srour et al. |
| 2010/0076992 | A1* | 3/2010 | Barstow .............. G06F 16/2246 |
| | | | 707/E17.108 |
| 2010/0161648 | A1 | 6/2010 | Eberlein et al. |
| 2011/0219354 | A1 | 9/2011 | Zhang et al. |
| 2012/0084261 | A1 | 4/2012 | Parab |
| 2012/0131646 | A1 | 5/2012 | Chandolu et al. |
| 2014/0172914 | A1 | 6/2014 | Elnikety et al. |
| 2014/0237560 | A1 | 8/2014 | Knjazihhin et al. |
| 2014/0289391 | A1 | 9/2014 | Balaji et al. |
| 2014/0304399 | A1* | 10/2014 | Chaudhary ......... G06F 11/3093 |
| | | | 709/224 |
| 2015/0067641 | A1 | 3/2015 | Nyisztor et al. |
| 2015/0254289 | A1 | 9/2015 | Junkergard et al. |
| 2015/0296000 | A1 | 10/2015 | Chandramouli et al. |
| 2015/0324391 | A1 | 11/2015 | Werner |
| 2015/0379082 | A1 | 12/2015 | Hu et al. |
| 2016/0092455 | A1 | 3/2016 | Pedapudi et al. |
| 2016/0352745 | A1 | 12/2016 | Ilieva et al. |
| 2017/0005877 | A1* | 1/2017 | Papadimitriou ........ H04L 45/70 |
| 2017/0177305 | A1 | 6/2017 | Charfi et al. |
| 2017/0255886 | A1 | 9/2017 | Schmidt et al. |
| 2018/0173561 | A1 | 6/2018 | Moroski et al. |
| 2018/0219752 | A1 | 8/2018 | Wang et al. |
| 2018/0287903 | A1* | 10/2018 | Joshi ..................... H04L 43/062 |
| 2019/0079788 | A1 | 3/2019 | Ruty et al. |
| 2019/0205230 | A1 | 7/2019 | Basham et al. |
| 2019/0268266 | A1* | 8/2019 | Mathison ................ H04L 45/74 |
| 2019/0306237 | A1 | 10/2019 | Srinivasan et al. |
| 2019/0362087 | A1 | 11/2019 | Ferrans et al. |
| 2020/0021615 | A1 | 1/2020 | Wainner et al. |
| 2020/0052957 | A1 | 2/2020 | Tubillara et al. |
| 2020/0053087 | A1 | 2/2020 | Wilson et al. |
| 2020/0059483 | A1* | 2/2020 | Weingarten ........... G06F 21/552 |
| 2020/0073896 | A1 | 3/2020 | Nagaraj et al. |
| 2020/0073987 | A1 | 3/2020 | Perumala et al. |
| 2020/0137097 | A1 | 4/2020 | Zimmermann et al. |
| 2020/0177608 | A1* | 6/2020 | Okunlola ............ H04L 63/1425 |
| 2020/0192773 | A1 | 6/2020 | Savino et al. |
| 2020/0274472 | A1 | 8/2020 | A et al. |
| 2020/0349513 | A1 | 11/2020 | Farah |
| 2021/0042098 | A1 | 2/2021 | Madisetti et al. |
| 2021/0360083 | A1 | 11/2021 | Duggal et al. |
| 2021/0406317 | A1* | 12/2021 | Beedgen ............. G06F 11/3476 |
| 2022/0012045 | A1 | 1/2022 | Rudraraju et al. |
| 2022/0035714 | A1 | 2/2022 | Schultz et al. |
| 2022/0171648 | A1 | 6/2022 | Rodriguez et al. |
| 2022/0188332 | A1* | 6/2022 | Weaver ............... G06F 16/2358 |
| 2022/0318060 | A1 | 10/2022 | Choochotkaew et al. |

OTHER PUBLICATIONS

Lin, et al., "A multi-dimensional extensible cloud-native service stack for enterprises", Journal of Cloud Computing, 2022, 11:83, 18 pages.

Ma, et al., "Configuration-Driven Data Pipeline", online: https://learn.microsoft.com/en-us/azure/architecture/solution-ideas/articles/configuration-driven-data-pipeline, accessed Feb. 27, 2023, 7 pages.

Miller, Jim, Flexible Meta Models and IBM Cognos Framework Manager, online: https://blogs.perficient.com/2014/05/29/flexible-meta-models-and-ibm-cognos-framework-manager/, May 29, 2014, accessed Mar. 6, 2023, 17 pages.

"Webinar—Bring Extensibility into Your Data Pipelines with Snowflake", online: https://resources.snowflake.com/webinars-thought-leadership/webinar-bring-extensibility-into-your-data-pipelines-with-snowflake, Jul. 9, 2020, 1 page.

Yan, et al., "Multi-SQL: An extensible multi-model data query language", online: arXiv:2011.08724v1, Nov. 2020, 16 pages.

Zhou, et al., "DB2MMT: A massive multi-tenant database platform for cloud computing", 2011 Eighth IEEE International Conference on e-Business Engineering, Oct. 2011, pp. 335-340, IEEE Computer Society.

International Search Report and Written Opinion for International Application No. PCT/US2023/016505, mailed Jun. 30, 2023, 13 Pages.

Sun J-Z., et al., "Extending SQL to Support QoS and Semantic Data Gathering in WSN", 2010 2nd International Conference on Software Engineering and Data Mining (SEDM), IEEE, Piscataway, NJ, USA, Jun. 23, 2010, pp. 86-90, XP031728146, The whole document.

* cited by examiner

| Measurable Software Tech, Sorted and Grouped by Proximity to the End Customer |
|---|
| OUTCOMES<br>Payment/Revenue Goods/Services Received Inventory Updated Dis/Satisfaction Success/Failure Support Brand Capital |
| INTERACTIONS<br>Page views Impressions Gestures Clicks Voice Commands Keystrokes Downloads Attention |
| EXPERIENCES<br>Sessions App Usage IoT Usage Messaging/Notifications Waiting/latency Errors/Bugs |
| JOURNEYS<br>Business Journeys Workflows |
| APP FLOWS<br>Business Transactions Service Endpoints Calls Third Party "Backends" |
| APPLICATIONS<br>Application Services APIs Microservices Scripts Daemons Deployments |
| INFRASTRUCTURE SERVICES<br>Databases Virtual Machines Containers Orchestration Meshes Security Services Logging |
| INFRASTRUCTURE<br>Servers Networks Storage Compute Datacenters Loadbalancers |

FIG. 4

```
# For service instances, copy all matching attribute names to properties and remaining to
# tags (match by convention)
scopeFilter: containsAll(resourceAttributes, ["service.namespace", "service.name", "service.instance.id"])
fmmType: service.instance
```
⎫ 1210

```
# Copy all attributes starting with "service." to entity properties. Copy remaining to tags
scopeFilter: containsAll(resourceAttributes, ["service.namespace", "service.name", "service.instance.id"])
fmmType: service.instance
mappings:
 - to: attributes
   from: attributes.stream().filter (kv -> kv.getKey().startsWith("service."))
 - to: tags
   from: attributes.stream().filter(kv -> !kv.getKey().startsWith("service."))
```
⎫ 1220

```
#Define specific mappings for entity attribute and tags
scopeFilter: containsAll(resourceAttributes, ["service_name"])
fmmType: service
mappings:
 # Same mapping can be written concisely. See attributeNameMappings below.
 - to: attributes
   from: {"key": "service.name", "value": getValue(attributes, "service_name"))
 # Same mapping can be written concisely. See tagNameMappings below.
 - to: tags
   from: {"key": "business.unit", "value": getValue (attributes, "business_unit"))
   attributeNameMappings:
     service.name: service_name
   tagNameMappings:
     business.unit: business_unit
```
⎫ 1230

FIG. 12

GRAPH-BASED QUERY ENGINE FOR AN EXTENSIBILITY PLATFORM

RELATED APPLICATION

This application claims priority to U.S. Prov. Appl. No. 63/326,159, filed Mar. 31, 2022, entitled GRAPH-BASED QUERY ENGINE FOR AN EXTENSIBILITY PLATFORM, by Hendrey, et al., the contents of which are incorporated herein by reference.

TECHNICAL FIELD

The present disclosure relates generally to computer systems, and, more particularly, to a graph-based query engine for an extensibility platform.

BACKGROUND

The Internet and the World Wide Web have enabled the proliferation of web services available for virtually all types of businesses and many online applications now rely on a distributed set of web services to function. These web services introduce complex data dependencies, complex data handling configurations, and various other operational nuances, which make monitoring them particularly challenging. Indeed, the monitoring and logging of data across web services is currently handled today in a discrete and/or non-centralized fashion with respect to each web service. Doing so in this manner also makes it difficult to associate the logged data across the different web services.

In addition, monitoring the web services in a discrete manner also runs the risk of breaking the software application already running in the cloud, such as when monitoring code is added for one web service without accounting for where that web service fits within the overall execution of the application and with respect to its dependencies, data handling, etc. This discrete treatment of monitoring web services has the effect of siloing off monitoring software utilities and limiting access to the data they collect. In addition, even were the monitoring to be performed centrally by an extensibility platform, storing and reporting on the monitored data from the various sources in a unified manner remains challenging.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 4 illustrates an example of layers of full-stack observability;

FIG. 12 illustrates an example of resource mapping configurations;

DESCRIPTION OF EXAMPLE EMBODIMENTS

Overview

Figure 1:
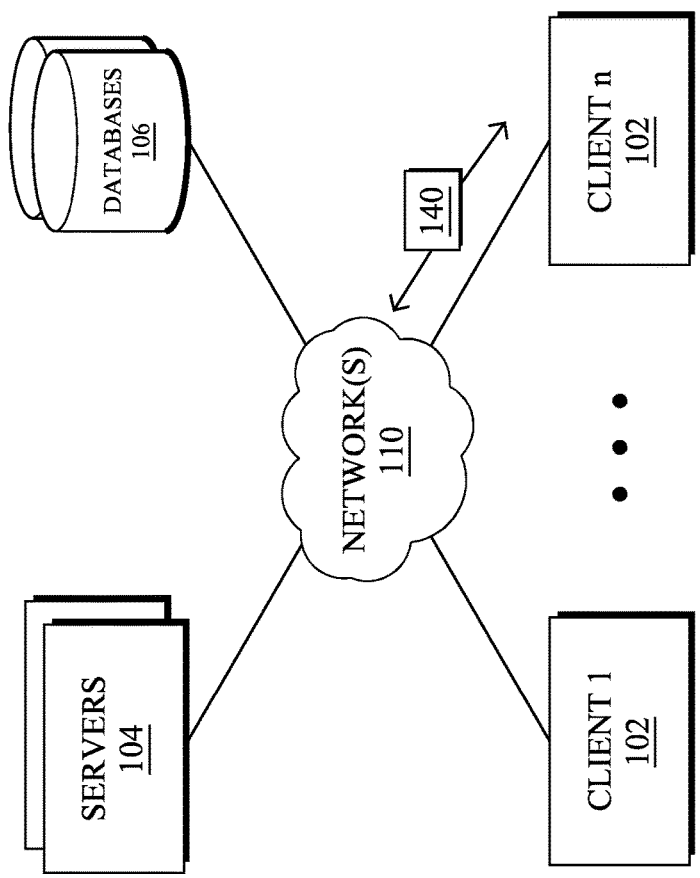
FIG. 1 illustrates an example computer network.

According to one or more embodiments of the disclosure, a graph-based query engine for an extensibility platform is described herein. In particular, the techniques herein are directed toward a "Unified Query Language" (UQL) which is a domain-specific language for observation data in the extensibility platform. UQL is a declarative language, and is a data query language. UQL supports reading only—it does not allow for data modification. UQL is a domain-specific language for the Metrics, Events, Logs, and Traces (MELT) data model. UQL presents MELT data and state in the scope of monitored topology.

Specifically, according to one or more embodiments of the disclosure, an illustrative method herein may comprise: accessing information from an extensibility platform configured to monitor observability data from a monitored computer network topology; receiving, from a requesting device, a query regarding the information, the query formatted according to a unified query language for the extensibility platform; determining which specific requested data from the information to return in response to the query based on a fetch block within the query; determining one or more bounding blocks within the query that establish one or more boundaries on the query, wherein one of the one or more bounding blocks comprises a topology boundary block to define a specific topology of the monitored computer network topology, wherein the specific topology identifies one or more entities within the monitored computer network topology to which the query is specifically directed; and returning, to the requesting device, results of the query as defined by the requested data to return and limited to the specific topology.

Other embodiments are described below, and this overview is not meant to limit the scope of the present disclosure.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

FIG. 1 is a schematic block diagram of an example simplified computing system 100 illustratively comprising any number of client devices 102 (e.g., a first through nth client device), one or more servers 104, and one or more databases 106, where the devices may be in communication with one another via any number of networks 110. The one or more networks 110 may include, as would be appreciated, any number of specialized networking devices such as routers, switches, access points, etc., interconnected via wired and/or wireless connections. For example, devices 102-104 and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some embodiments, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art.

Those skilled in the art will also understand that any number of nodes, devices, links, etc. may be used in computing system 100, and that the view shown herein is for simplicity. Also, those skilled in the art will further understand that while the network is shown in a certain orientation, the system 100 is merely an example illustration that is not meant to limit the disclosure.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

Figure 2:
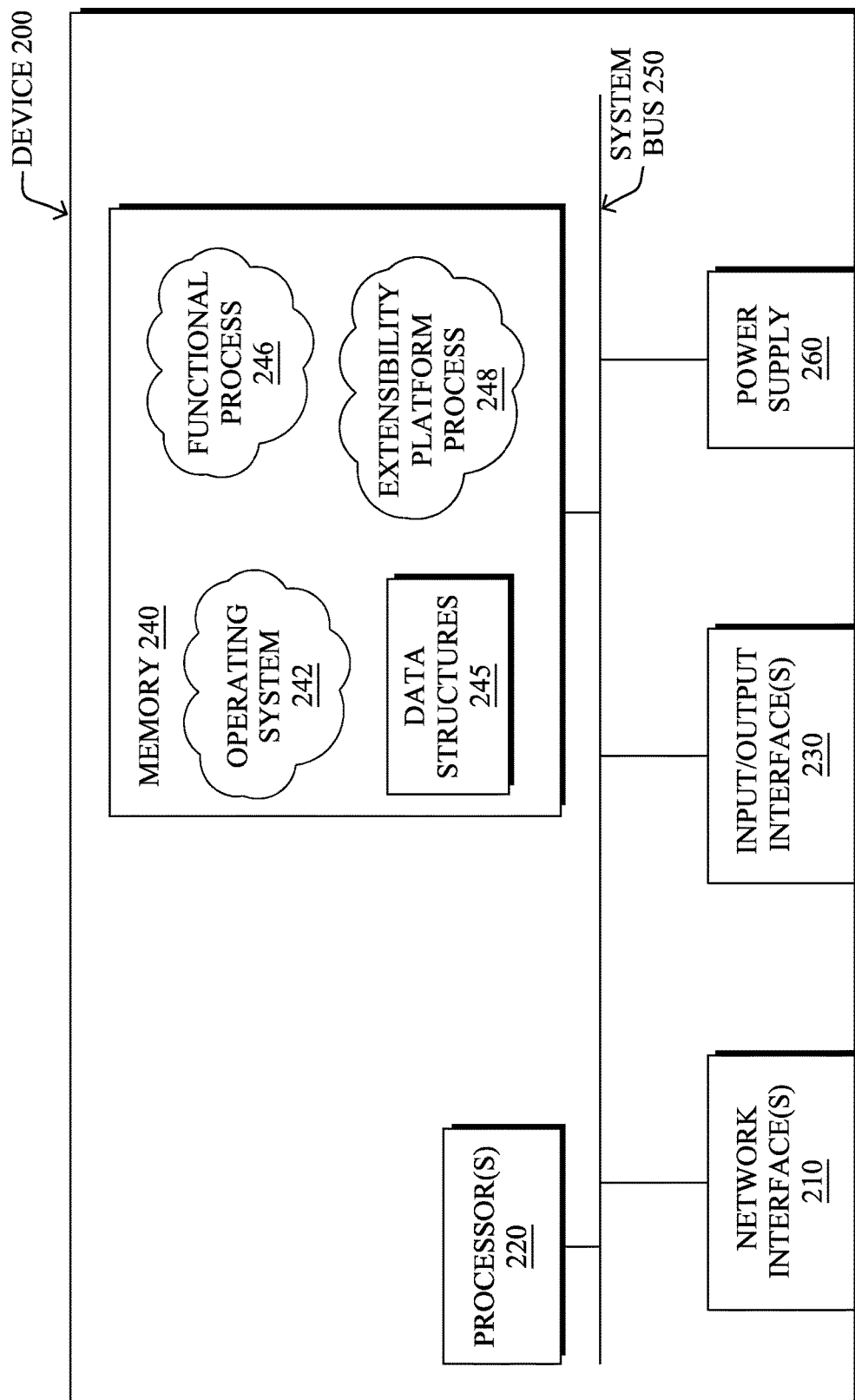
FIG. 2 illustrates an example computing device/node.

FIG. 2 is a schematic block diagram of an example node/device 200 that may be used with one or more embodiments described herein, e.g., as any of the devices 102-106 shown in FIG. 1 above. Device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network(s) 110. The network interfaces may be configured to transmit and/or receive data using a variety of different communication protocols. Note, further, that device 200 may have multiple types of network connections via interfaces 210, e.g., wireless and wired/physical connections, and that the view herein is merely for illustration.

Depending on the type of device, other interfaces, such as input/output (I/O) interfaces 230, user interfaces (UIs), and so on, may also be present on the device. Input devices, in particular, may include an alpha-numeric keypad (e.g., a keyboard) for inputting alpha-numeric and other information, a pointing device (e.g., a mouse, a trackball, stylus, or cursor direction keys), a touchscreen, a microphone, a camera, and so on. Additionally, output devices may include speakers, printers, particular network interfaces, monitors, etc.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise a one or more functional processes 246, and on certain devices, an illustrative "extensibility platform" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Observability Intelligence Platform

As noted above, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a software as a service (SaaS) over a network, such as the Internet. As an example, a distributed application can be implemented as a SaaS-based web service available via a web site that can be accessed via the Internet. As another example, a distributed application can be implemented using a cloud provider to deliver a cloud-based service.

Users typically access cloud-based/web-based services (e.g., distributed applications accessible via the Internet) through a web browser, a light-weight desktop, and/or a mobile application (e.g., mobile app) while the enterprise software and user's data are typically stored on servers at a remote location. For example, using cloud-based/web-based services can allow enterprises to get their applications up and running faster, with improved manageability and less maintenance, and can enable enterprise IT to more rapidly adjust resources to meet fluctuating and unpredictable business demand. Thus, using cloud-based/web-based services can allow a business to reduce Information Technology (IT) operational costs by outsourcing hardware and software maintenance and support to the cloud provider.

However, a significant drawback of cloud-based/web-based services (e.g., distributed applications and SaaS-based solutions available as web services via web sites and/or using other cloud-based implementations of distributed applications) is that troubleshooting performance problems can be very challenging and time consuming. For example, determining whether performance problems are the result of the cloud-based/web-based service provider, the customer's own internal IT network (e.g., the customer's enterprise IT network), a user's client device, and/or intermediate network providers between the user's client device/internal IT network and the cloud-based/web-based service provider of a distributed application and/or web site (e.g., in the Internet) can present significant technical challenges for detection of such networking related performance problems and determining the locations and/or root causes of such networking related performance problems. Additionally, determining whether performance problems are caused by the network or an application itself, or portions of an application, or particular services associated with an application, and so on, further complicate the troubleshooting efforts.

Certain aspects of one or more embodiments herein may thus be based on (or otherwise relate to or utilize) an observability intelligence platform for network and/or application performance management. For instance, solutions are available that allow customers to monitor networks and applications, whether the customers control such networks and applications, or merely use them, where visibility into such resources may generally be based on a suite of "agents" or pieces of software that are installed in different locations in different networks (e.g., around the world).

Specifically, as discussed with respect to illustrative FIG. 3 below, performance within any networking environment may be monitored, specifically by monitoring applications and entities (e.g., transactions, tiers, nodes, and machines) in the networking environment using agents installed at individual machines at the entities. As an example, applications may be configured to run on one or more machines (e.g., a customer will typically run one or more nodes on a machine, where an application consists of one or more tiers, and a tier consists of one or more nodes). The agents collect data associated with the applications of interest and associated nodes and machines where the applications are being operated. Examples of the collected data may include performance data (e.g., metrics, metadata, etc.) and topology data (e.g., indicating relationship information), among other configured information. The agent-collected data may then be provided to one or more servers or controllers to analyze the data.

Examples of different agents (in terms of location) may comprise cloud agents (e.g., deployed and maintained by the observability intelligence platform provider), enterprise agents (e.g., installed and operated in a customer's network), and endpoint agents, which may be a different version of the previous agents that is installed on actual users' (e.g., employees') devices (e.g., on their web browsers or otherwise). Other agents may specifically be based on categorical configurations of different agent operations, such as language agents (e.g., Java agents, .Net agents, PHP agents, and others), machine agents (e.g., infrastructure agents residing on the host and collecting information regarding the machine which implements the host such as processor usage, memory usage, and other hardware information), and network agents (e.g., to capture network information, such as data collected from a socket, etc.).

Each of the agents may then instrument (e.g., passively monitor activities) and/or run tests (e.g., actively create events to monitor) from their respective devices, allowing a customer to customize from a suite of tests against different networks and applications or any resource that they're interested in having visibility into, whether it's visibility into that end point resource or anything in between, e.g., how a device is specifically connected through a network to an end resource (e.g., full visibility at various layers), how a website is loading, how an application is performing, how a particular business transaction (or a particular type of business transaction) is being effected, and so on, whether for individual devices, a category of devices (e.g., type, location, capabilities, etc.), or any other suitable embodiment of categorical classification.

Figure 3:
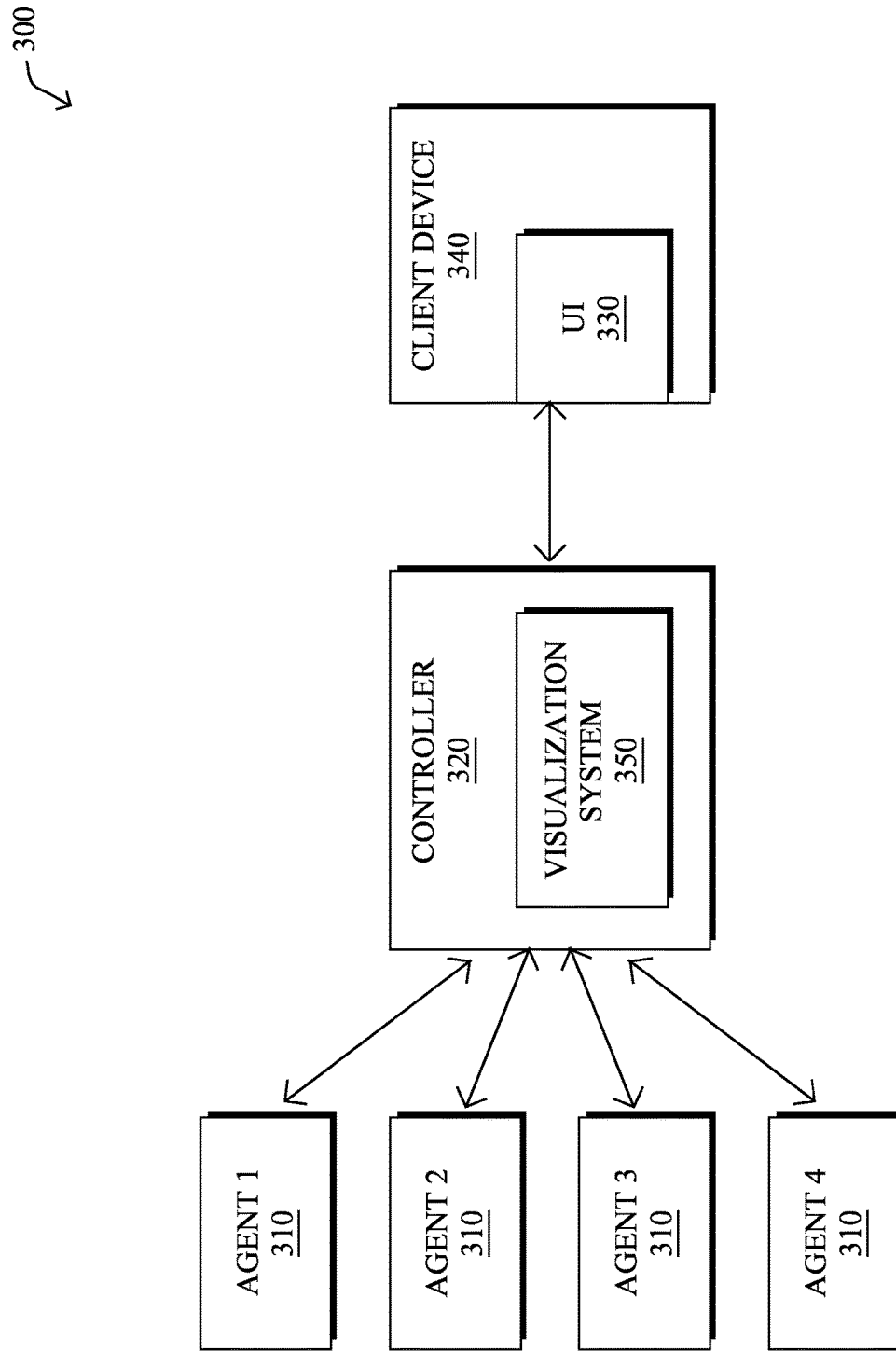
FIG. 3 illustrates an example observability intelligence platform.

FIG. 3 is a block diagram of an example observability intelligence platform 300 that can implement one or more aspects of the techniques herein. The observability intelligence platform is a system that monitors and collects metrics of performance data for a network and/or application environment being monitored. At the simplest structure, the observability intelligence platform includes one or more agents 310 and one or more servers/controllers 320. Agents may be installed on network browsers, devices, servers, etc., and may be executed to monitor the associated device and/or application, the operating system of a client, and any other application, API, or another component of the associated device and/or application, and to communicate with (e.g., report data and/or metrics to) the controller(s) 320 as directed. Note that while FIG. 3 shows four agents (e.g., Agent 1 through Agent 4) communicatively linked to a single controller, the total number of agents and controllers can vary based on a number of factors including the number of networks and/or applications monitored, how distributed the network and/or application environment is, the level of monitoring desired, the type of monitoring desired, the level of user experience desired, and so on.

For example, instrumenting an application with agents may allow a controller to monitor performance of the application to determine such things as device metrics (e.g., type, configuration, resource utilization, etc.), network browser navigation timing metrics, browser cookies, application calls and associated pathways and delays, other aspects of code execution, etc. Moreover, if a customer uses agents to run tests, probe packets may be configured to be sent from agents to travel through the Internet, go through many different networks, and so on, such that the monitoring solution gathers all of the associated data (e.g., from returned packets, responses, and so on, or, particularly, a lack thereof). Illustratively, different "active" tests may comprise HTTP tests (e.g., using curl to connect to a server and load the main document served at the target), Page Load tests (e.g., using a browser to load a full page—i.e., the main document along with all other components that are included in the page), or Transaction tests (e.g., same as a Page Load, but also performing multiple tasks/steps within the page—e.g., load a shopping website, log in, search for an item, add it to the shopping cart, etc.).

The controller 320 is the central processing and administration server for the observability intelligence platform. The controller 320 may serve a browser-based user interface (UI) 330 that is the primary interface for monitoring, analyzing, and troubleshooting the monitored environment. Specifically, the controller 320 can receive data from agents 310 (and/or other coordinator devices), associate portions of data (e.g., topology, business transaction end-to-end paths and/or metrics, etc.), communicate with agents to configure collection of the data (e.g., the instrumentation/tests to execute), and provide performance data and reporting through the interface 330. The interface 330 may be viewed as a web-based interface viewable by a client device 340. In some implementations, a client device 340 can directly communicate with controller 320 to view an interface for monitoring data. The controller 320 can include a visualization system 350 for displaying the reports and dashboards related to the disclosed technology. In some implementations, the visualization system 350 can be implemented in a separate machine (e.g., a server) different from the one hosting the controller 320.

Notably, in an illustrative Software as a Service (SaaS) implementation, a controller instance 320 may be hosted remotely by a provider of the observability intelligence platform 300. In an illustrative on-premises (On-Prem) implementation, a controller instance 320 may be installed locally and self-administered.

The controllers 320 receive data from different agents 310 (e.g., Agents 1-4) deployed to monitor networks, applications, databases and database servers, servers, and end user clients for the monitored environment. Any of the agents 310 can be implemented as different types of agents with specific monitoring duties. For example, application agents may be installed on each server that hosts applications to be monitored. Instrumenting an agent adds an application agent into the runtime process of the application.

Database agents, for example, may be software (e.g., a Java program) installed on a machine that has network access to the monitored databases and the controller. Standalone machine agents, on the other hand, may be standalone programs (e.g., standalone Java programs) that collect hardware-related performance statistics from the servers (or other suitable devices) in the monitored environment. The standalone machine agents can be deployed on machines that host application servers, database servers, messaging servers, Web servers, etc. Furthermore, end user monitoring (EUM) may be performed using browser agents and mobile agents to provide performance information from the point of view of the client, such as a web browser or a mobile native application. Through EUM, web use, mobile use, or combinations thereof (e.g., by real users or synthetic agents) can be monitored based on the monitoring needs.

Note that monitoring through browser agents and mobile agents are generally unlike monitoring through application agents, database agents, and standalone machine agents that are on the server. In particular, browser agents may generally be embodied as small files using web-based technologies, such as JavaScript agents injected into each instrumented web page (e.g., as close to the top as possible) as the web page is served, and are configured to collect data. Once the web page has completed loading, the collected data may be bundled into a beacon and sent to an EUM process/cloud for processing and made ready for retrieval by the controller. Browser real user monitoring (Browser RUM) provides insights into the performance of a web application from the point of view of a real or synthetic end user. For example, Browser RUM can determine how specific Ajax or iframe calls are slowing down page load time and how server performance impact end user experience in aggregate or in individual cases. A mobile agent, on the other hand, may be a small piece of highly performant code that gets added to the source of the mobile application. Mobile RUM provides information on the native mobile application (e.g., iOS or Android applications) as the end users actually use the mobile application. Mobile RUM provides visibility into the functioning of the mobile application itself and the mobile application's interaction with the network used and any server-side applications with which the mobile application communicates.

Note further that in certain embodiments, in the application intelligence model, a business transaction represents a particular service provided by the monitored environment. For example, in an e-commerce application, particular real-world services can include a user logging in, searching for items, or adding items to the cart. In a content portal, particular real-world services can include user requests for content such as sports, business, or entertainment news. In a stock trading application, particular real-world services can include operations such as receiving a stock quote, buying, or selling stocks.

A business transaction, in particular, is a representation of the particular service provided by the monitored environment that provides a view on performance data in the context of the various tiers that participate in processing a particular request. That is, a business transaction, which may be identified by a unique business transaction identification (ID), represents the end-to-end processing path used to fulfill a service request in the monitored environment (e.g., adding items to a shopping cart, storing information in a database, purchasing an item online, etc.). Thus, a business transaction is a type of user-initiated action in the monitored environment defined by an entry point and a processing path across application servers, databases, and potentially many other infrastructure components. Each instance of a business transaction is an execution of that transaction in response to a particular user request (e.g., a socket call, illustratively associated with the TCP layer). A business transaction can be created by detecting incoming requests at an entry point and tracking the activity associated with request at the originating tier and across distributed components in the application environment (e.g., associating the business transaction with a 4-tuple of a source IP address, source port, destination IP address, and destination port). A flow map can be generated for a business transaction that shows the touch points for the business transaction in the application environment. In one embodiment, a specific tag may be added to packets by application specific agents for identifying business transactions (e.g., a custom header field attached to a hypertext transfer protocol (HTTP) payload by an application agent, or by a network agent when an application makes a remote socket call), such that packets can be examined by network agents to identify the business transaction identifier (ID) (e.g., a Globally Unique Identifier (GUID) or Universally Unique Identifier (UUID)). Performance monitoring can be oriented by business transaction to focus on the performance of the services in the application environment from the perspective of end users. Performance monitoring based on business transactions can provide information on whether a service is available (e.g., users can log in, check out, or view their data), response times for users, and the cause of problems when the problems occur.

In accordance with certain embodiments, the observability intelligence platform may use both self-learned baselines and configurable thresholds to help identify network and/or application issues. A complex distributed application, for example, has a large number of performance metrics and each metric is important in one or more contexts. In such environments, it is difficult to determine the values or ranges that are normal for a particular metric; set meaningful thresholds on which to base and receive relevant alerts; and determine what is a "normal" metric when the application or infrastructure undergoes change. For these reasons, the disclosed observability intelligence platform can perform anomaly detection based on dynamic baselines or thresholds, such as through various machine learning techniques, as may be appreciated by those skilled in the art. For example, the illustrative observability intelligence platform herein may automatically calculate dynamic baselines for the monitored metrics, defining what is "normal" for each metric based on actual usage. The observability intelligence platform may then use these baselines to identify subsequent metrics whose values fall out of this normal range.

In general, data/metrics collected relate to the topology and/or overall performance of the network and/or application (or business transaction) or associated infrastructure, such as, e.g., load, average response time, error rate, percentage CPU busy, percentage of memory used, etc. The controller UI can thus be used to view all of the data/metrics that the agents report to the controller, as topologies, heatmaps, graphs, lists, and so on. Illustratively, data/metrics can be accessed programmatically using a Representational State Transfer (REST) API (e.g., that returns either the JavaScript Object Notation (JSON) or the eXtensible Markup Language (XML) format). Also, the REST API can be used to query and manipulate the overall observability environment.

Those skilled in the art will appreciate that other configurations of observability intelligence may be used in accordance with certain aspects of the techniques herein, and that other types of agents, instrumentations, tests, controllers, and so on may be used to collect data and/or metrics of the network(s) and/or application(s) herein. Also, while the description illustrates certain configurations, communication links, network devices, and so on, it is expressly contemplated that various processes may be embodied across multiple devices, on different devices, utilizing additional devices, and so on, and the views shown herein are merely simplified examples that are not meant to be limiting to the scope of the present disclosure.

An Extensibility Platform

One specific example of an observability intelligence platform above is the AppDynamics Observability Cloud (OC), available from Cisco Systems, Inc. of San Jose, California. The AppDynamics OC is a cloud-native platform for collecting, ingesting, processing and analyzing large-scale data from instrumented complex systems, such as Cloud system landscapes. The purpose of the platform is to host solutions that help customers to keep track of the operational health and performance of the systems they observe and perform detailed analyses of problems or performance issues.

AppDynamics OC is designed to offer full-stack Observability, that is, to cover multiple layers of processes ranging from low-level technical processes such as networking and computing infrastructure over inter-service communication up to interactions of users with the system and business processes, and most importantly, the interdependencies between them. FIG. 4, for example, illustrates an example 400 of layers of full-stack observability, demonstrating measurable software technologies, sorted and grouped by proximity to the end customer. For instance, the layers 410 and associated technologies 420 may be such things as:

Outcomes:
  payment/revenue; goods/services received; inventory updated; dissatisfaction/satisfaction; success/failure; support; brand capital; etc.
Interactions:
  page views; impressions; gestures; clicks; voice commands; keystrokes; downloads; attention; etc.
Experiences:
  sessions; app usage; IoT usage; messaging/notifications; waiting/latency; errors/bugs etc.
Journeys:
  business journeys; workflows; etc.
App Flows:
  business transactions; service endpoints; calls; third party "backends"; etc.
Applications:
  application services; APIs; microservices; scripts; daemons; deployments; etc.
Infrastructure Services:
  databases; virtual machines; containers; orchestration; meshes; security services; logging; etc.

Infrastructure:
servers; networks; storage; compute; datacenters; load balancers; etc.

Each of these layers has different types of entities and metrics that need to be tracked. Additionally, different industries or customers may have different flavors of each layer or different layers altogether. The entirety of artifacts represented in each layer and their relationships can be described—independent of any digital representation—in a domain model.

In the development of a conventional application, the domain model is encoded in a data model which is pervasively reflected in the coding of all parts of a solution and thus predetermines all its capabilities. Any substantial extension of these capabilities requiring changes in the data model results in a full iteration of the software lifecycle, usually involving: Updating database schemas, data access objects, in-memory representation of data, data-processing algorithms, application interface (API), and user interface. The coordination of all these changes to ensure the integrity of the solution(s) is particularly difficult in cloud-native systems due to their distributed nature, and substantial teams in every software company are dedicated to this task.

The task becomes harder the more moving parts and the more actors are involved. But the sheer bandwidth of domain models and functionality hinted at in FIG. 4 above makes it all but impossible for a single company to deliver all the required solutions in a centralized development process. A platform thus should allow customers and partners to adapt and extend the solutions, or even provide entirely new solutions, with minimal risk of breaking or compromising the production system running in the cloud. The biggest challenge lies in the fact that all these solutions are not isolated from each other but must run for each tenant as an individually composed, integrated application sharing most of the data and infrastructure.

In order to make this possible, the techniques herein are directed at taking a novel approach to solution composition, informed by elements of model-driven architecture, graph data models, and modern pull-based software lifecycle management. That is, the techniques herein, therefore, are directed toward an extensibility platform that provides a solution packaging system that allows for data-type dependencies.

Figure 5:
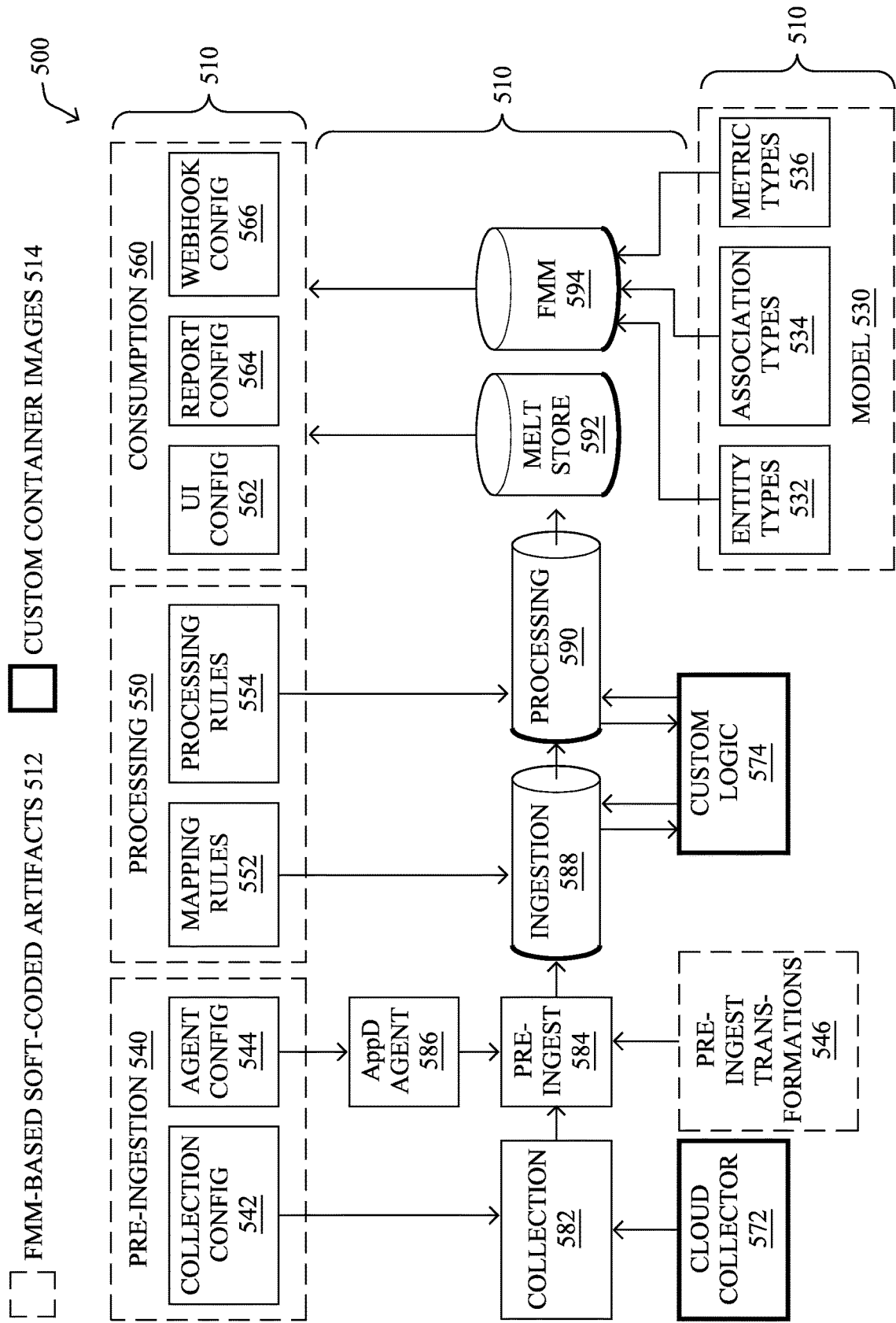
FIG. 5 illustrates an example platform data flow.

Operationally, the extensibility platform is built on the principle of strictly separating the solutions from the executing platform's technology stack in order to decouple their respective life cycles. The solutions are very much (e.g., almost entirely) model-driven, so that the platform can evolve and undergo optimizations and technological evolution without affecting the existing solutions. In the rare cases in which the models are not powerful enough, custom logic can be provided as a Function as a Service (FaaS) or container image exposing a well-defined service interface and running in a strictly controlled sandbox. FIG. 5, for instance, showing a platform data flow 500 (described further below), illustrates how different solution-specific artifacts 510 interact with the platform's core functionality 520 (e.g., the data flow in the middle).

Solutions herein thus provide artifacts that enrich, customize, or alter the behavior data ingestions, processing, and visualizations. This allows a company and/or application such as IT management companies/apps to provide a customized monitoring solution for data management platforms (e.g., NoSQL databases), for example, on the observability intelligence platform above. Such a custom solution may therefore include the definition of data management platform entities that are monitored, and the relationship between those entities, and their metrics. The example IT management app for data management platforms can also provide enrichments to the user interface, such as providing distinct iconography for their entities, and bundling dashboards and alerts that take particular advantage of data management platform-specific metrics, such as a data management platform heartbeat metric. This same system of packaging may be used to provision the system with having "core" domains specific to the illustrative observability intelligence platform, the only difference being that subscription to system apps is automatic. In addition, first party apps like EUM may also leverage the same system.

In particular, the extensibility platform techniques herein are directed to a solution packaging system that allows for data-type dependencies. It is essentially the JSON store and solution packaging that are collectively referred to herein as "Orion". The system is designed to allow modules to have dependencies like a traditional code/packaging system like java+maven, while simultaneously allowing these models to define their data model, access to that data model, packaging of objects conforming to other data solution data models, etc. This relies heavily on the concept of "layering". While other systems may allow layering of local files, the ability to have layers that include global dynamic layers, as well as static global layers provided as part of a solution is never before seen, and solves a big problem.

As described herein, the techniques herein provide a system designed to provide "full stack observability" for distributed computer systems. That is, the system provides the ability to receive Metrics, Events, Logs, and Traces (MELT) data/signals in accordance with Open Telemetry standards. It also provides the ability to maintain an internal model of the actual entities being observed, as well as an ability to map incoming data/signals to entities under observation. Further, the extensibility platform herein provides the ability to query the entities of the system with regard to their associated MELT data/signals, and to infer health and other computed signals about entities. Entities may also be grouped together into composite entities to thus receive, generate, and maintain data/signals about composite entities, accordingly. Moreover, as detailed herein, the platform also has an openness to first, second, and third parties to "extend" all of the above so that the platform can continuously incorporate new use cases without each use case having to be "hand written" by the core engineering team.

The techniques herein also provide extensibility in a multi-tenant, app-aware, platform for MELT data processing, allowing for third parties to create solutions to which tenants can subscribe, and allowing for system capabilities to be defined and packaged in a way that is functionally identical to third party solutions. In addition, this allows third parties to extend the platform with capabilities not previously envisioned, such as, e.g., to augment the platform with new data types and storage for instances of those types, to augment the platform with new functions (lambda style), to augment the platform interfaces (REST, gRPC) with new APIs whose implementation is backed by lambda style functions and data storage, to augment the platform's built-in data processing in ways that benefit the solution without impacting tenants who have not subscribed to the solution, and so on.

Through providing extensibility in a multi-tenant, app-aware, platform for MELT data processing, the techniques herein also provide an extensible object modeling system for a multi-tenant microservices architecture. This allows dynamic composition of objects from mutable layers, which allows for applications/solutions to define object types, and for applications/solutions to bundle object instances (instances may be of a type defined by another solution that is a dependency or defined locally in the same solution). It also allows for tenants to override application/solution values, which enables tenants to customize the behavior of a solution.

The dynamic composition of objects from mutable layers also allows an implementation comprised of a tree-shaped object layering system with layers/awareness for, illustratively:

depth 0 (tree root): global system settings/fields;
depth 1: global application/solution constructs;
depth 2: account (a collection of tenants spanning multiple cells);
depth 3: tenant; and
depth 4: user.

Moreover, the dynamic composition of objects from mutable layers further allows a communication system between globally distributed cells to enable each cell to have a synchronized local copy of the global layers, as well as a read-time composition system to compose object from layers.

The extensible object modeling system for a multi-tenant microservices architecture further provides a system for global solution management, which comprises a method of packaging apps/solutions, a method of declaring dependencies between solutions, a customer facing solution registry allowing developers to list their solutions, and so on.

The multi-tenant microservices architecture further provides a type system of meta-data for defining objects and their layers. That is, the techniques herein allow for specifying the shape of objects, declaring global/solution level object instances inside of solution packages, specifying which fields of the object support layering, specifying which fields are secrets, allowing inter-object references (e.g., allowing runtime spreading of fields to support inheritance and other use cases, allowing recursive prefetching of fields, allowing references to global object-layer-resident instances, etc.), and so on.

Additionally, the multi-tenant microservices architecture herein provides a system for managing object storage and retrieval by type. For instance, such a system may define a method of routing traffic to object stores based on the object type (e.g., a federation of object stores providing a single API/facade to access all types), as well as allowing atomic, eventually consistent maintenance of references between objects.

The extensible object modeling system for a multi-tenant microservices architecture additionally provides a system for ensuring atomicity of installation and updates to multi-object application/solutions across microservices in a cell. It also provides a library/client that allows pieces of our internal system to query and observe objects for changes (e.g., allowing MELT data ingestion pipeline to store configuration objects in memory, and avoiding having to query for "freshness" each time the object is needed).

As detailed herein, there are numerous concepts generally addressed by the extensibility platform of the present disclosure. Such concepts may comprise such things as:

a programmable data ingestion framework;
atomic maintenance of references between objects in a distributed type system;
atomicity of keys in document shredding for domain events;
automation of sagas in a distributed object store;
type systems in functions as a service (FaaS);
large scale data collection programmable by an end user;
managing multi-tenancy in data ingestion pipeline;
federation of a distributed object store;
improvements to operations in a distributed object store;
expression of user interface customization in terms of flexibly defined entity models;
a system of type layering in a multitenant, global distributed system;
customizing the inputs of a multi-tenant distributed system;
management of secure keys in a distributed multi-tenant system;
managing secure connections to external systems in a "bring your infrastructure" scenario;
automating workflows for the collection of secrets in a layered configuration system;
protecting developer secrets in FaaS environment;
Optimization of FaaS using intelligent caching in a programmable distributed data environment;
automating failover and restoration in a cell based architecture;
a modular entity modeling system;
a potential replacement for traditional telemetry for dashboards;
eventually consistent deployment of artifacts in distributed data processing pipeline;
Configuration-driven extensible MELT data processing pipeline;
Extracting additional value from the MELT data via customizable workflows;
Creating a graph-centric model from MELT data for observability;
Tag-aware attribute based access control for distributed systems;
Metadata-based graph schema definition;
Ensuring fairness in a multi-tenant system via rate limiting;
Configuration-driven Query Composition for Graph Data Structures;
And so on.

Notably, and to aide in the discussion below, the smallest deployable unit of extension is a "solution", which is a package of models, configurations, and potentially container images for customizing extension points. Solutions can depend on other solutions. For example, a system health solution depends on a "Flexible Meta Model" (FMM) solution (described below), since health apps provide entities and metrics that depend on an FMM-type system. Core solutions may be automatically installed in each cell (e.g., similar to how certain platforms come with certain libs pre-installed with the system). Note further that a "solution artifact" is a JSON configuration file that a solution uses to configure an extension point.

An extension point, that is, is a part of the extensibility platform that is prepared to accept a configuration or other artifact to steer its behavior. Since the architecture of the extensibility platform herein is largely model-driven, most of the extensions can be realized by means of soft-coded artifacts: Model extensions and configurations expressed as JSON or other declarative formats. For instance, as shown in the extensibility platform data flow 500 in FIG. 5, soft-coded extension artifacts 512 are shown, while for more complex—or stateful—logic, services can be plugged in, i.e., custom container images 514. The extension points can be divided into four groups, Model, Pre-Ingestion, Processing, and Consumption, as shown:

Model 530 (e.g., entity types 532, association types 534, and metric types 536);

Pre-Ingestion 540 (e.g., collection configuration 542, agent configuration 544, and pre-ingestion transformations 546);

Processing 550 (e.g., mapping rules 552, and processing rules 554); and Consumption. 560 (e.g., UI configuration 562, report configuration 564, and webhook configuration 566)

Moreover, custom container images 514 may comprise such things as a Cloud Collector 572 and Custom Logic 574.

As also shown in FIG. 5, the platform's core functionality 520 may comprise collection 582, pre-ingestion 584 (e.g., with agent configuration 544 coming via an observability or "AppD" agent 586), ingestion 588, processing 590, MELT store 592, and an FMM 594, with the functionalities being interconnected to each other and/or to the different solution-specific artifacts 510 as shown, and as generally described in detail herein.

Regarding details of the extensibility platform of the present disclosure, at the core of the extensibility platform herein is the Flexible Meta Model (FMM), which allows creation of models of each solution's specific artifacts, that is, entities (such as services or user journeys) and their associated observed data: Metrics, Events, Logs and Traces (together abbreviated as MELT).

Figure 6:
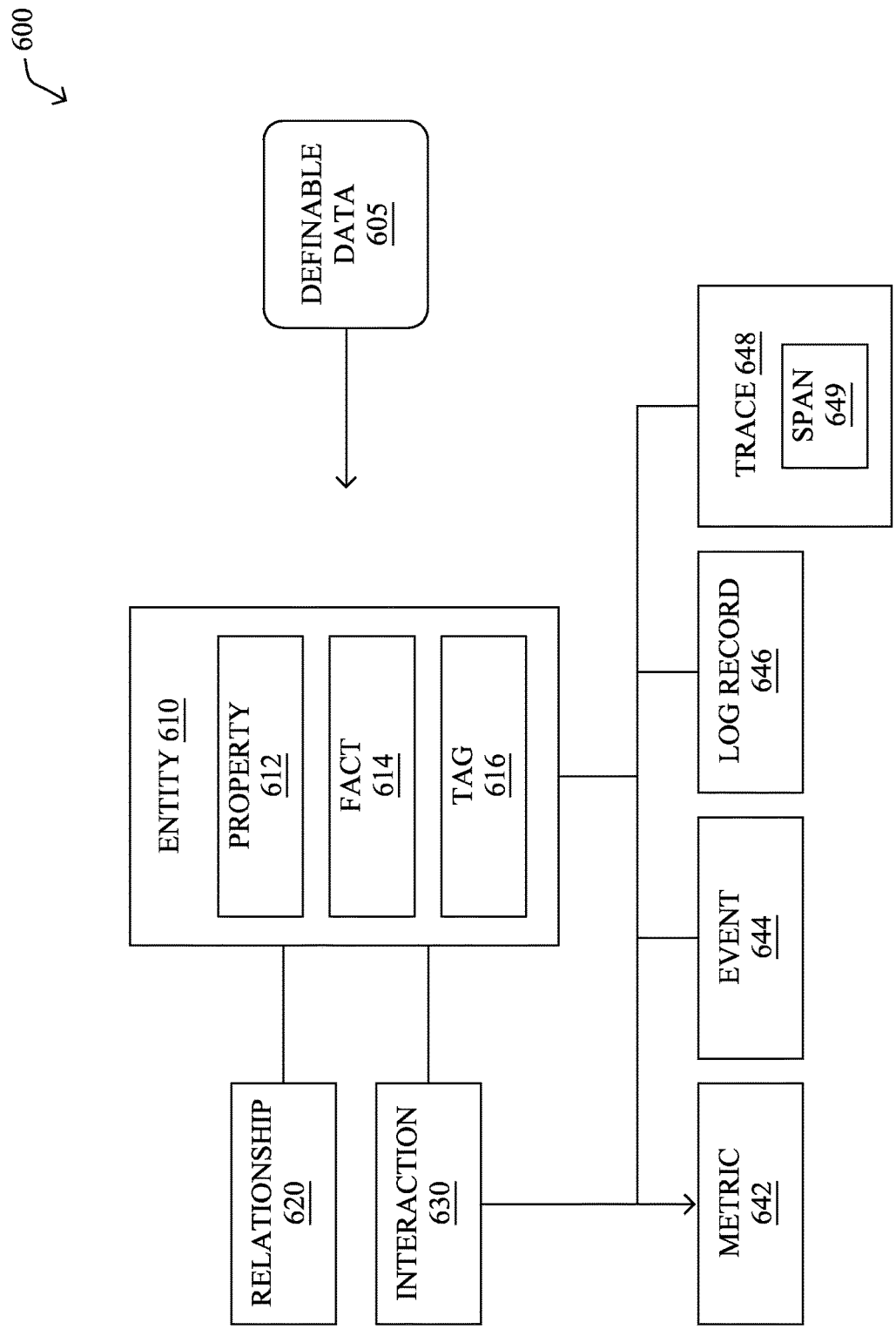
FIG. 6 illustrates an example of a Flexible Meta Model (FMM)

FIG. 6 shows a simplified schematic of the FMM 600. Each of the shaded boxes represents a "kind" of data 605 for which specific types (and instances) can be defined. Entity types 610 may have a property 612, fact 614, and tag 616. Examples for entity types 610 are: Service, Service Instance, Business Transaction, Host, etc.

Relationship types 620 define how entities are associated to each other (for example "contains" or "is part of"). Interaction types 630 describe how entities interact with each other. They combine the semantics of association types (e.g., a service "calls" a backend) with the capability of entity types to declare MELT data (Metric 642, Event 644, Log Record 646, and Trace 648 (with Span 649). In one embodiment, interaction types are treated just like entity types, though not so in other embodiments.

Figure 7A:
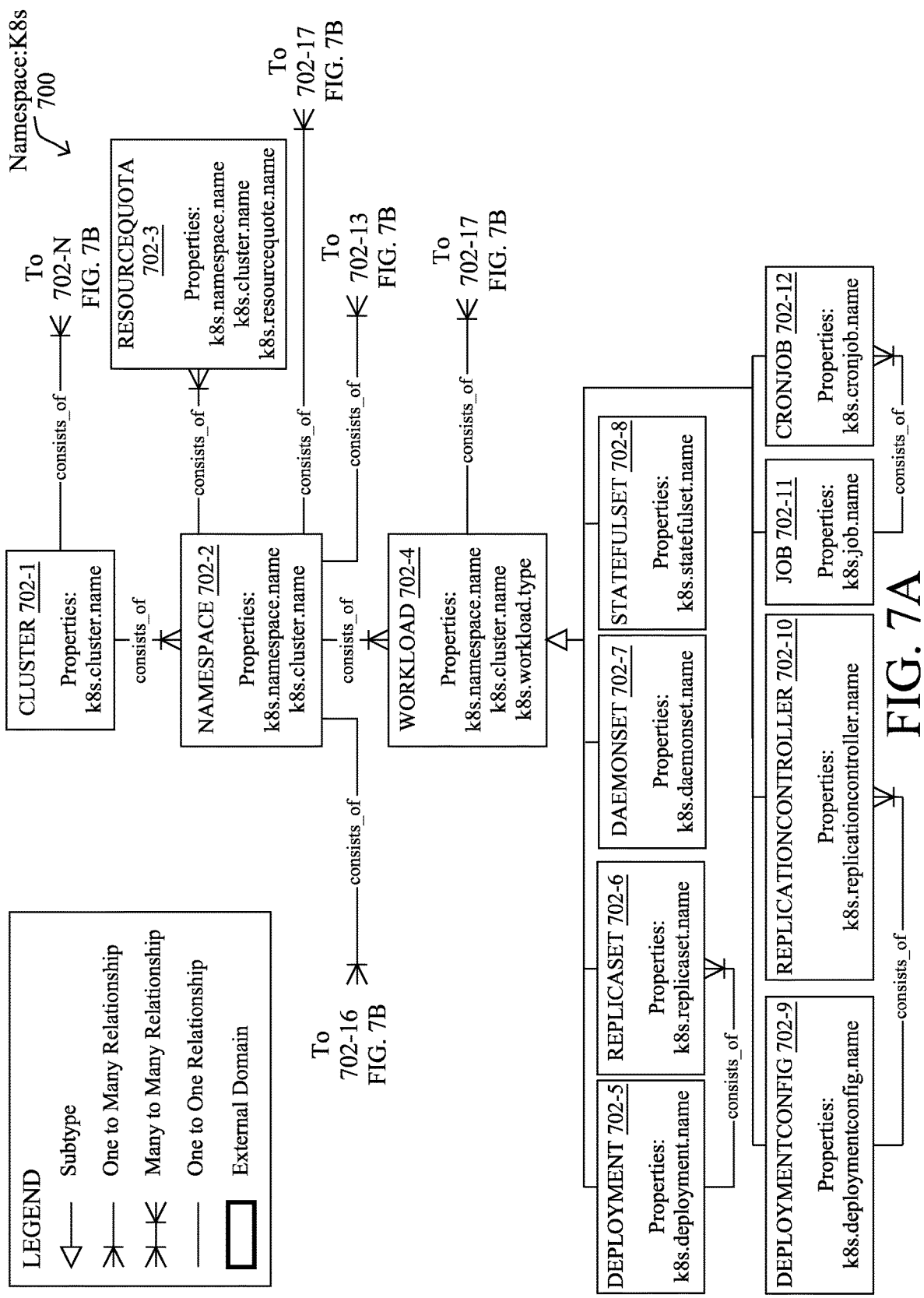
FIGS. 7A-7B illustrate a high-level example of a container orchestration domain model.
Figure 7B:
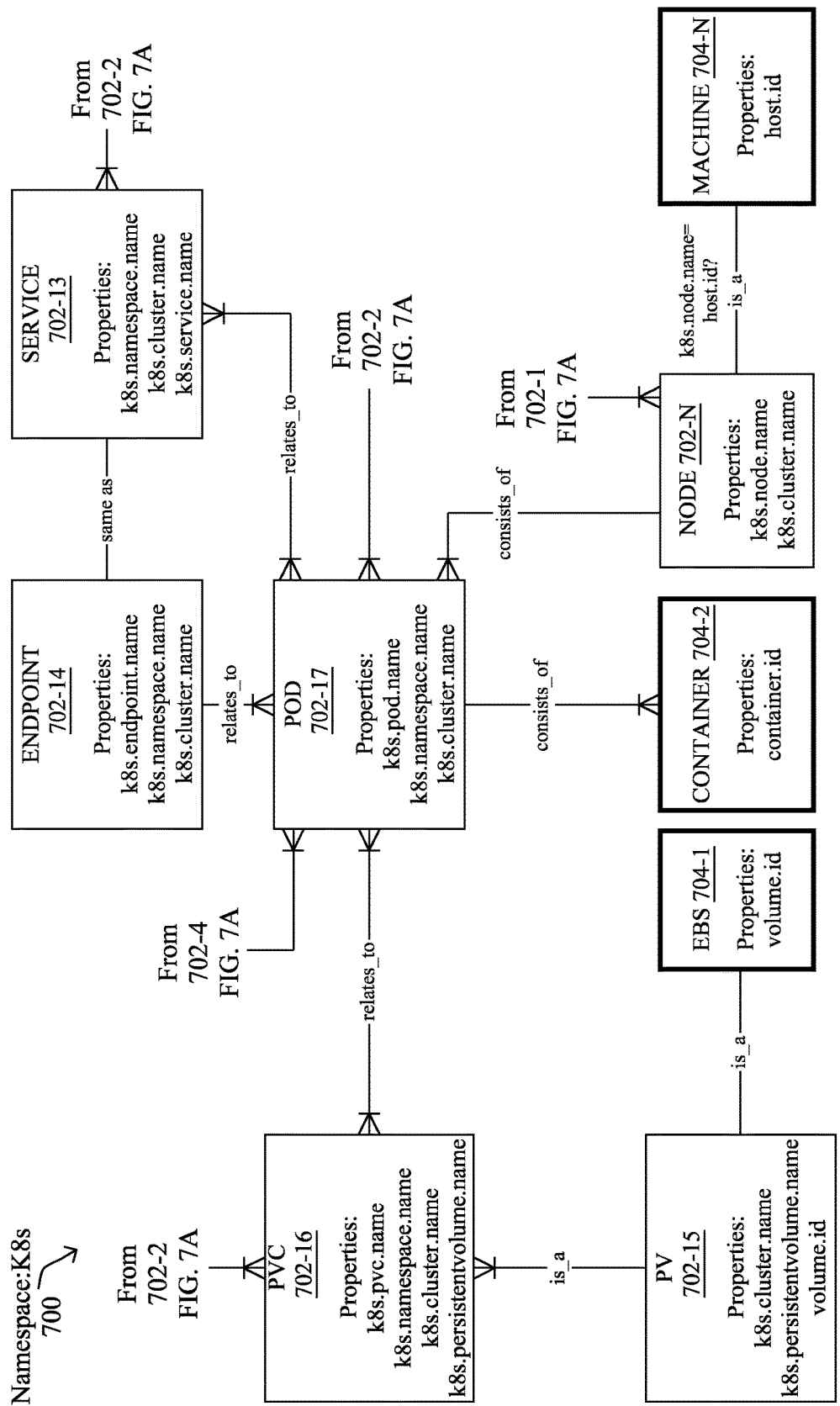

Based on this meta model, models of specific domains (such as a container orchestration) can be created. For instance, FIGS. 7A-7B illustrate a high-level example of a container orchestration domain model 700 (e.g., a Kubernetes or "K8s" domain model). The container orchestration domain model 700 may be made up of model components 702 (e.g., 702-1 . . . 702-N) organized with the illustrated relationships (e.g., subtype, one-to-many relationship, many-to-many relationship, one-to-one relationship). Additionally, the container orchestration domain model 700 may include model components that are external domain model components 704 (e.g., 704-1 . . . 704-N) that represent external domains sharing the illustrated relationships to the other model components 702. These models determine the content that a user eventually sees on their screen.

To complement this flexible metamodel, the platform has schema-flexible stores to hold the actual data: The graph-based entity store and schema-flexible stores for metrics, events, logs and traces respectively. Thus, a customer who wants to extend the data model just modifies the corresponding model in the FMM and can immediately start populating the data stores with the respective data, without having to make changes to the data stores themselves.

Corresponding changes in the models/configurations driving the data processing pipeline will immediately start generating the data to populate the stores according to the model changes. An important feature of the extensibility platform is that it doesn't treat the respective models of a solution (FMM data model, data processing and consumption models) in isolation. These models refer to each other (e.g., a UI field will have a reference to the field in the data model it represents) and the integrity and consistency of these mutual references is tracked and enforced.

The extensibility platform herein is cloud-native, but at the same time, it allows every tenant to experience it as an individually configured application that reflects their specific business and angle of view. The tenants achieve this by selectively subscribing to solutions for each aspect of their business, and in some cases by even adding their own custom solutions.

Figure 8:
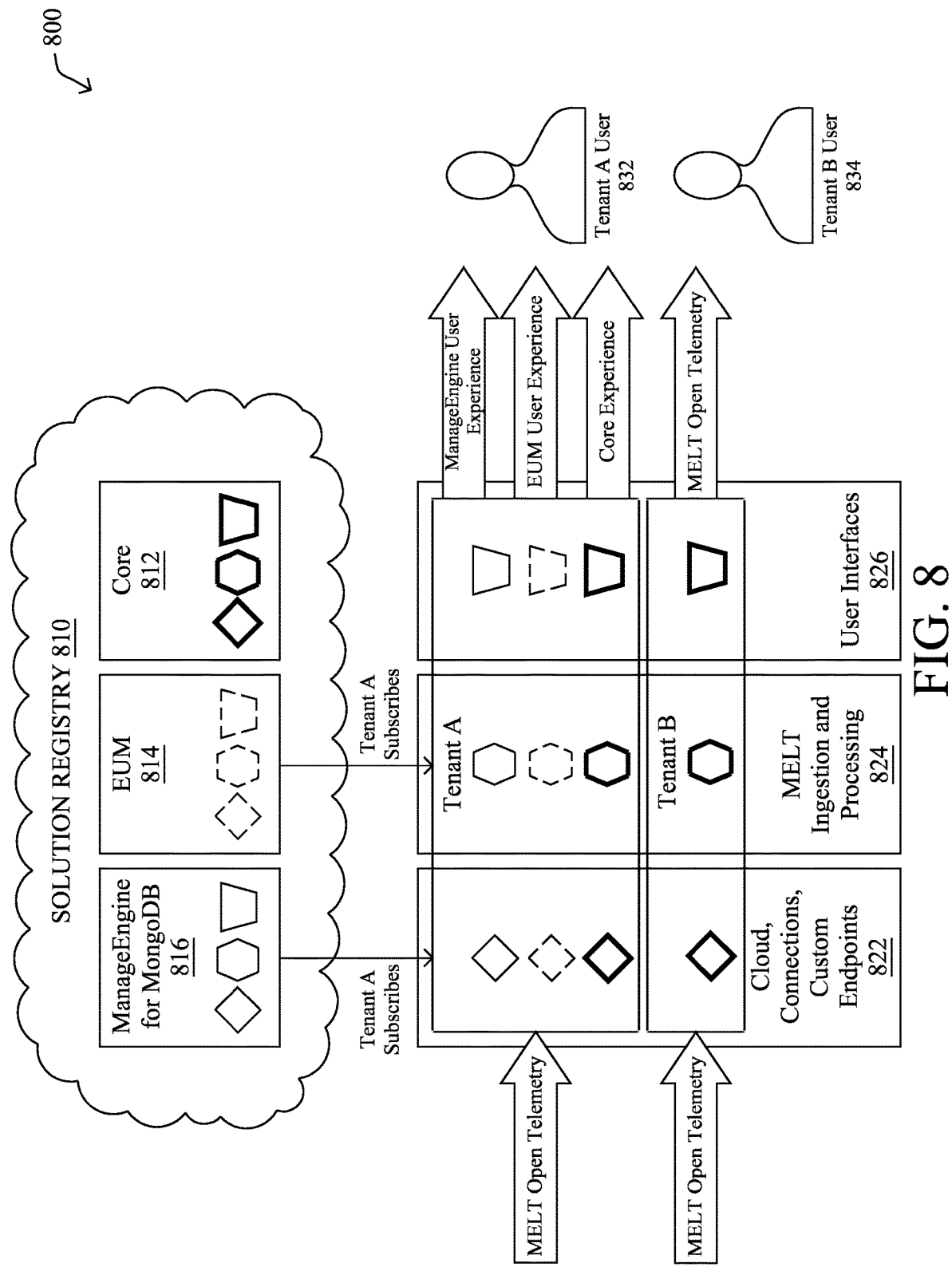
FIG. 8 illustrates an example of a sophisticated subscription and layering mechanism.

This is made possible by a sophisticated subscription and layering mechanism, illustrated in FIG. 8, illustrating tenant-specific behavior of the extensibility platform as a result of selective activation and layering of models. In this example mechanism 800, the solution registry 810 has three registered solutions, the platform core 812, End User Monitoring (EUM) 814 and a hypothetical third party solution, such as ManageEngine for MongoDB 816. Each of these solutions contains models for cloud connections and custom endpoints 822, MELT data ingestion and processing 824, and User Interfaces 826, respectively.

For each tenant (e.g., "A" or "B"), only the models that they are subscribed to are being used in the course of data collection, ingestion, processing and consumption, hence the experience of the tenant A user 832 in FIG. 8 is different from that of the tenant B user 834.

A particularly noteworthy characteristic of the platform herein is that these solutions don't necessarily live side-by-side. Rather, a solution can build on top of another solution, amend, and customize it. The final experience of tenant A user is therefore the result of the layering of the three subscribed solutions, where each can make modifications of the models of the layers below.

Notably, the scaling model of the extensibility platform herein is based on cells, where each cell serves a fixed set of tenants. Thus, the solution registry and model stores of each cell keep the superset of all the solutions (and the corresponding artifacts) to which the tenants of the cell have subscribed. When a tenant subscribes to a solution, the solution registry checks whether that solution is already present in the cell. If not, it initiates a pull from the solution repository.

Figure 9:
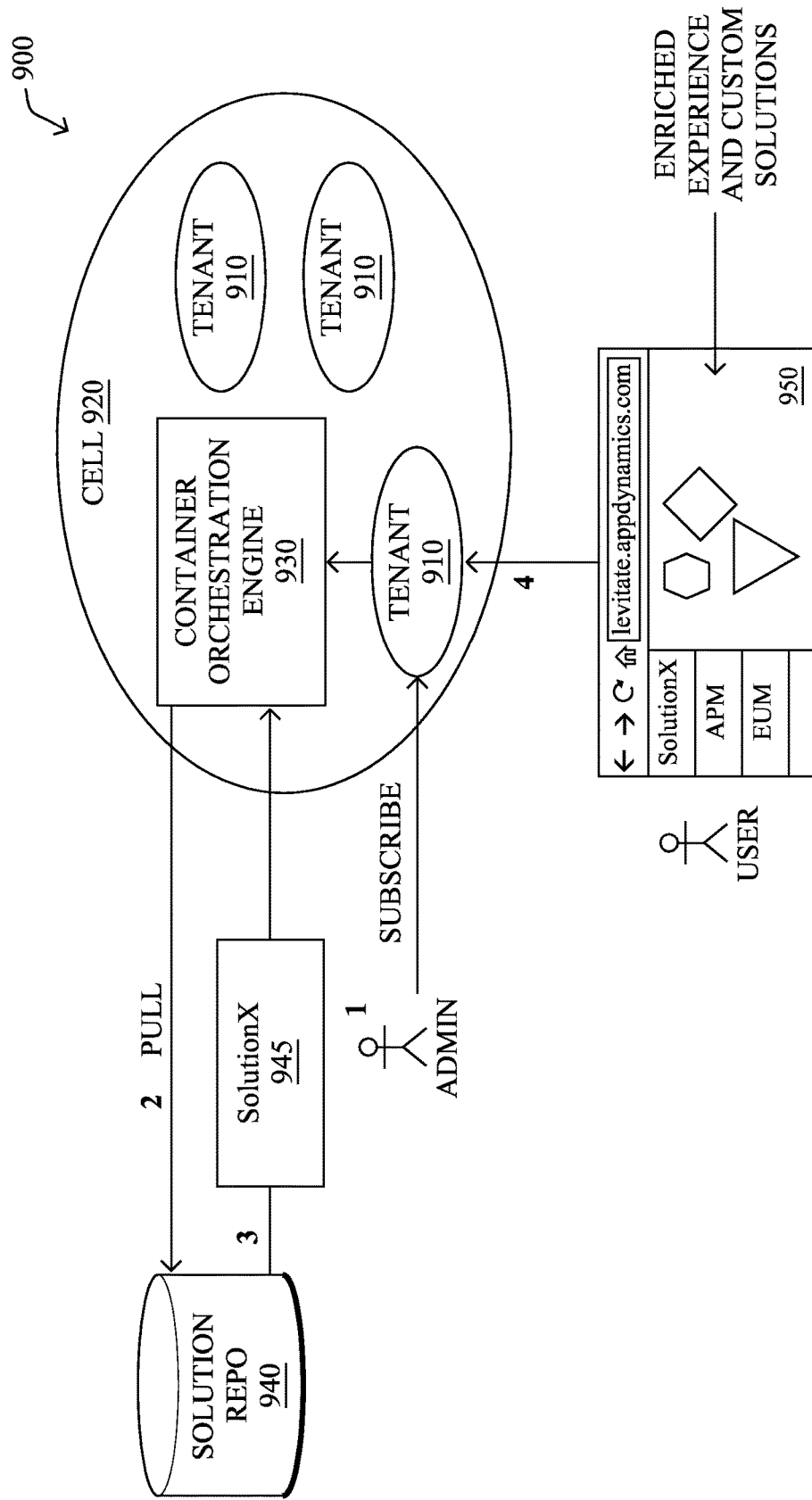
FIG. 9 illustrates an example interplay of tenant-specific solution subscription with cell management.

This concept is shown generally in FIG. 9, illustrating an example interplay 900 of tenant-specific solution subscription with cell management. In particular, tenants 910 exist within a cell 920, with an associated container orchestration engine 930 which pulls solutions 945 from a solution repository 940 ("solution repo"). A user interface 950 for the extensibility platform, such as an observability intelligence platform, can then illustrate an enhanced experience with custom solutions, accordingly.

Notably, in FIG. 9, when a solution is present in the cell (i.e., all its artifacts are present in the corresponding model stores), the solution is activated for the tenant. At that moment, the corresponding models/configurations will start taking effect.

Since the extensibility platform herein is a large distributed system, the models and configurations are not centrally stored but rather in multiple stores, each associated with one or more consumers of the respective model. Each of these stores is an instance of the same generic JSON store, and through routing rules, they are exposed as a single API with consistent behavior.

Figure 10:
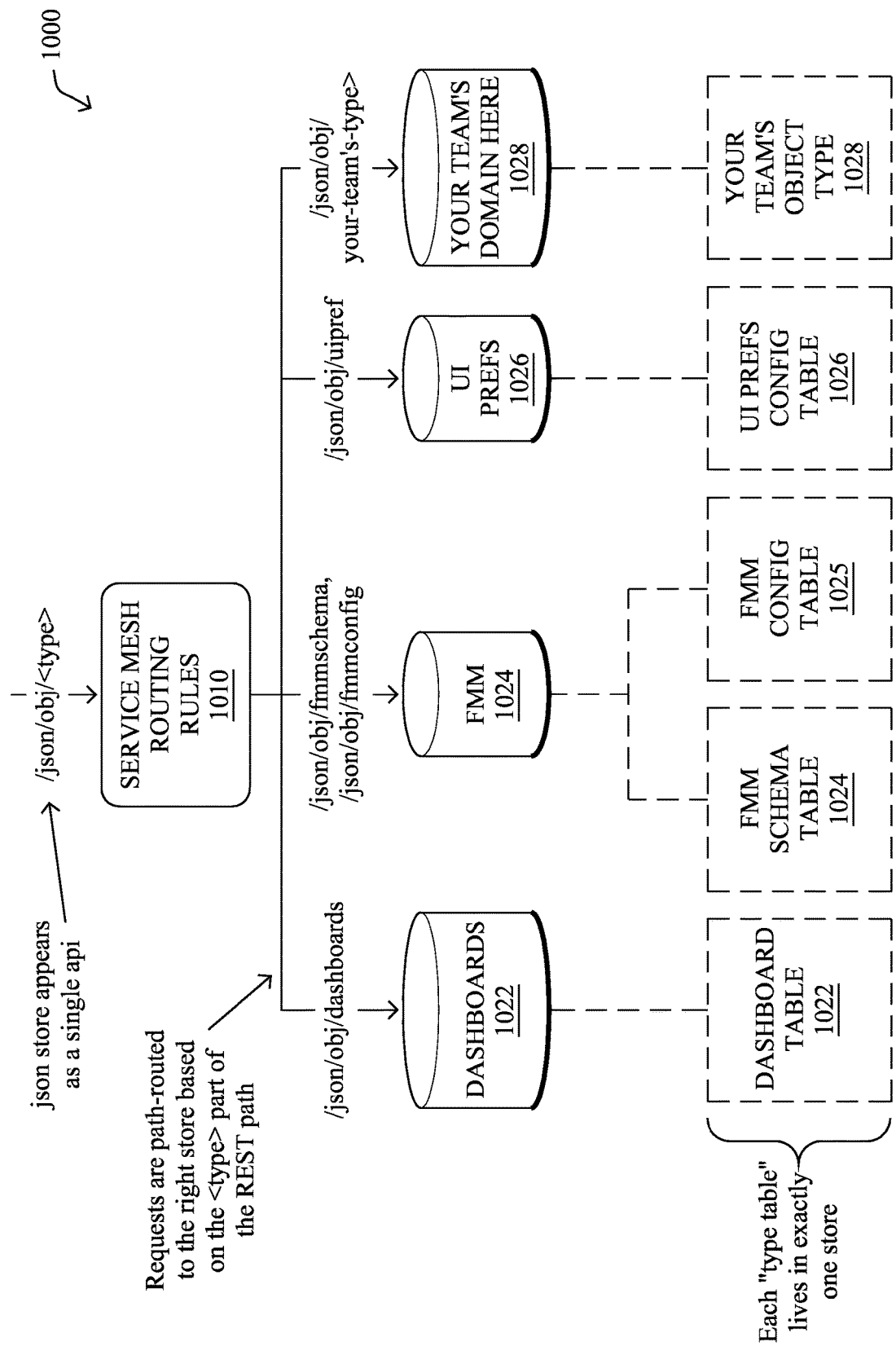
FIG. 10 illustrates an example of exposure of different configuration stores as a single API.

FIG. 10 illustrates an example 1000 of exposure of the different configuration stores as a single API. In particular, as shown, the JSON store appears as a single API and illustratively begins at service mesh routing rules 1010, where requests may be path-routed to the right store based on the <type> part of the REST path. The example stores may comprise dashboards 1022, FMM 1024, UI preferences 1026, custom stores 1028 (e.g., "Your Team's Domain Here"), and so on. From there, each "type table" lives in exactly one store. For instance, dashboard table 1032 (from dashboards 1022), FMM schema table 1034 or FMM config table 1035 (e.g., depending upon the access into FMM 1024), UI preferences config table 1036 from UI prefs 1026, and custom tables 1038 (e.g., from custom stores 1028, such as "Your Team's object type" from "Your Team's Domain Here").

Regarding a configuration-driven data processing pipeline herein, a core feature of the extensibility platform herein is its ability to ingest, transform, enrich, and store large amounts of observed data from agents and OpenTelemetry (OT) sources. The raw data at the beginning of the ingestion process adheres to the OpenTelemetry format, but doesn't have explicit semantics. In a very simplified way, the raw data can be characterized as trees of key-value pairs and unstructured text (in the case of logs).

The purpose of the processing pipeline is to extract the meaning of that raw data, to derive secondary information, detect problems and indicators of system health, and make all that information "queryable" at scale. An important part of being queryable is the connection between the data and its meaning, i.e., the semantics, which have been modeled in the respective domain models. Hence the transformation from raw data to meaningful content can't be hard-coded, it should (e.g., must) be encoded in rules and configurations, which should (e.g., must) be consistent with the model of each domain.

Figure 11A:
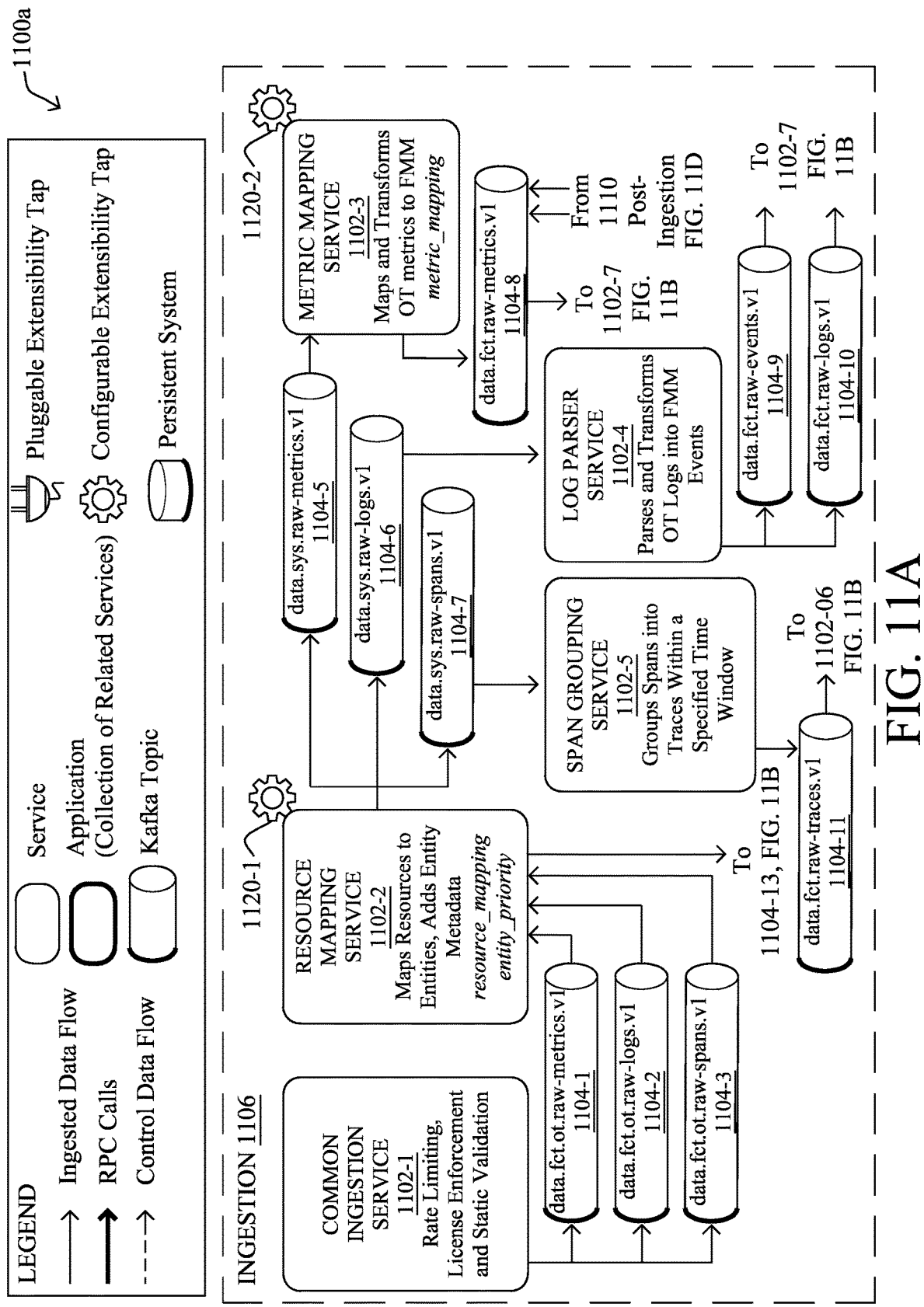
FIGS. 11A-11E illustrate an example of a common ingestion pipeline, in particular where each of FIGS. 11A-11E illustrate respective portions of the pipeline.
Figure 11B:
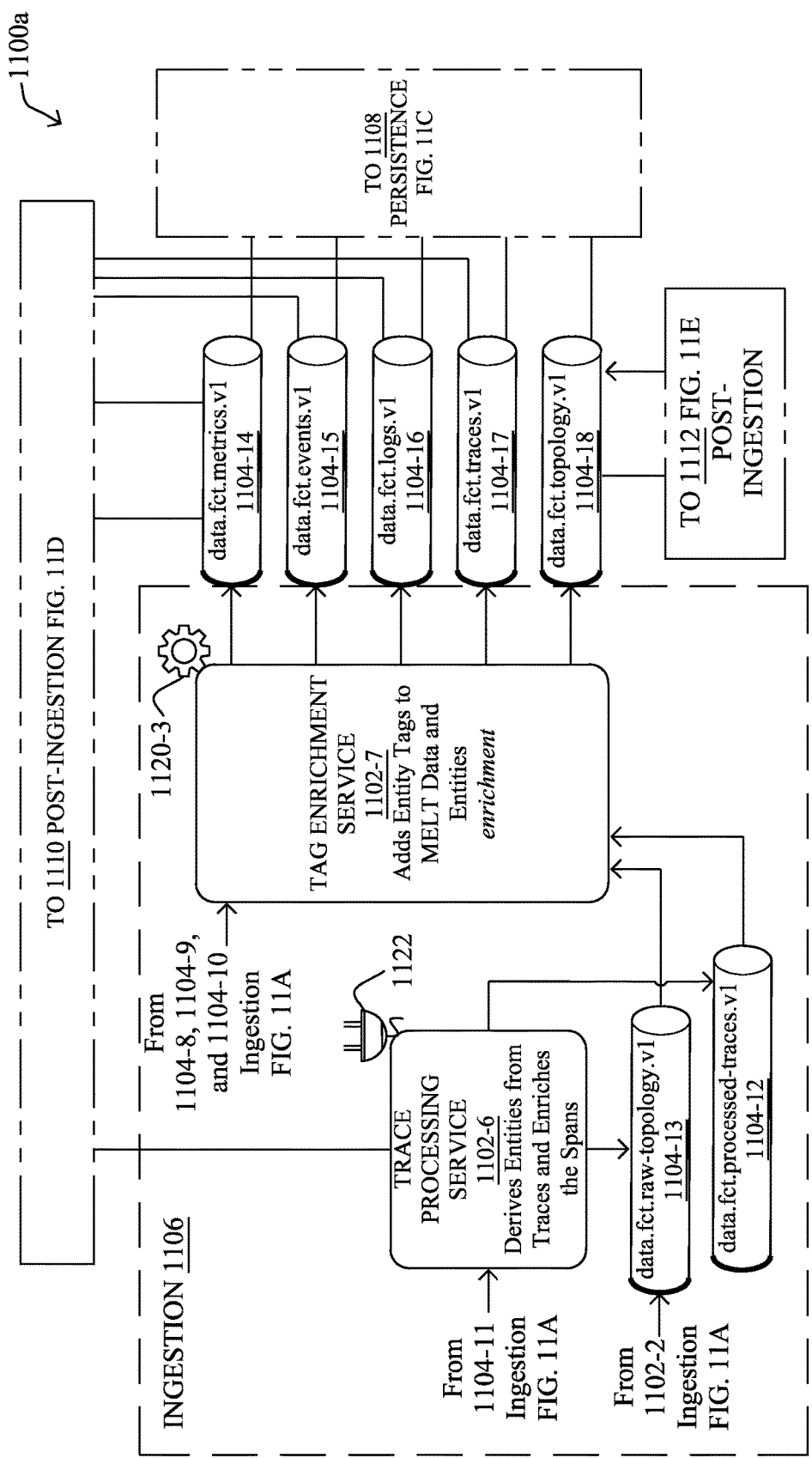
Figure 11C:
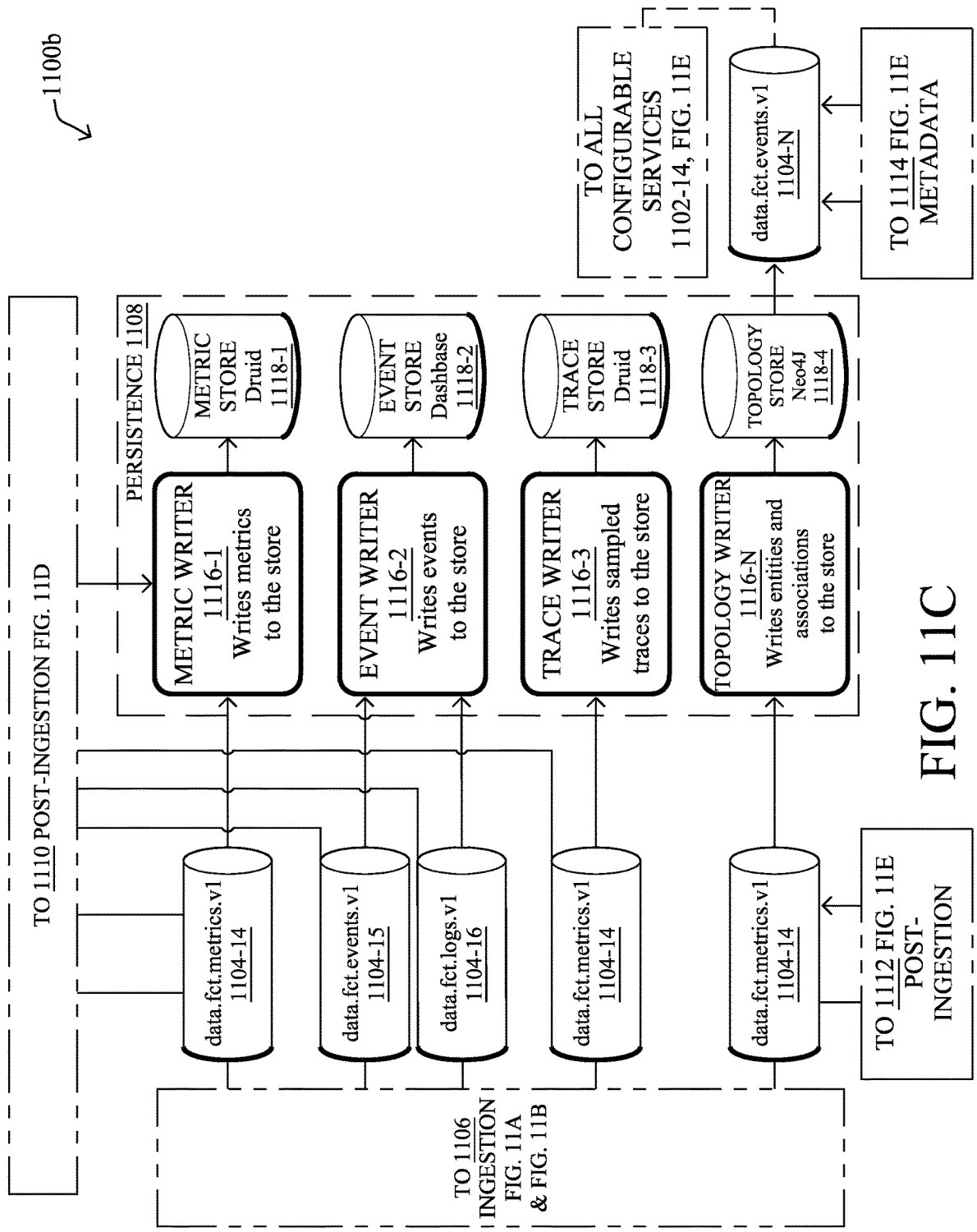
Figure 11D:
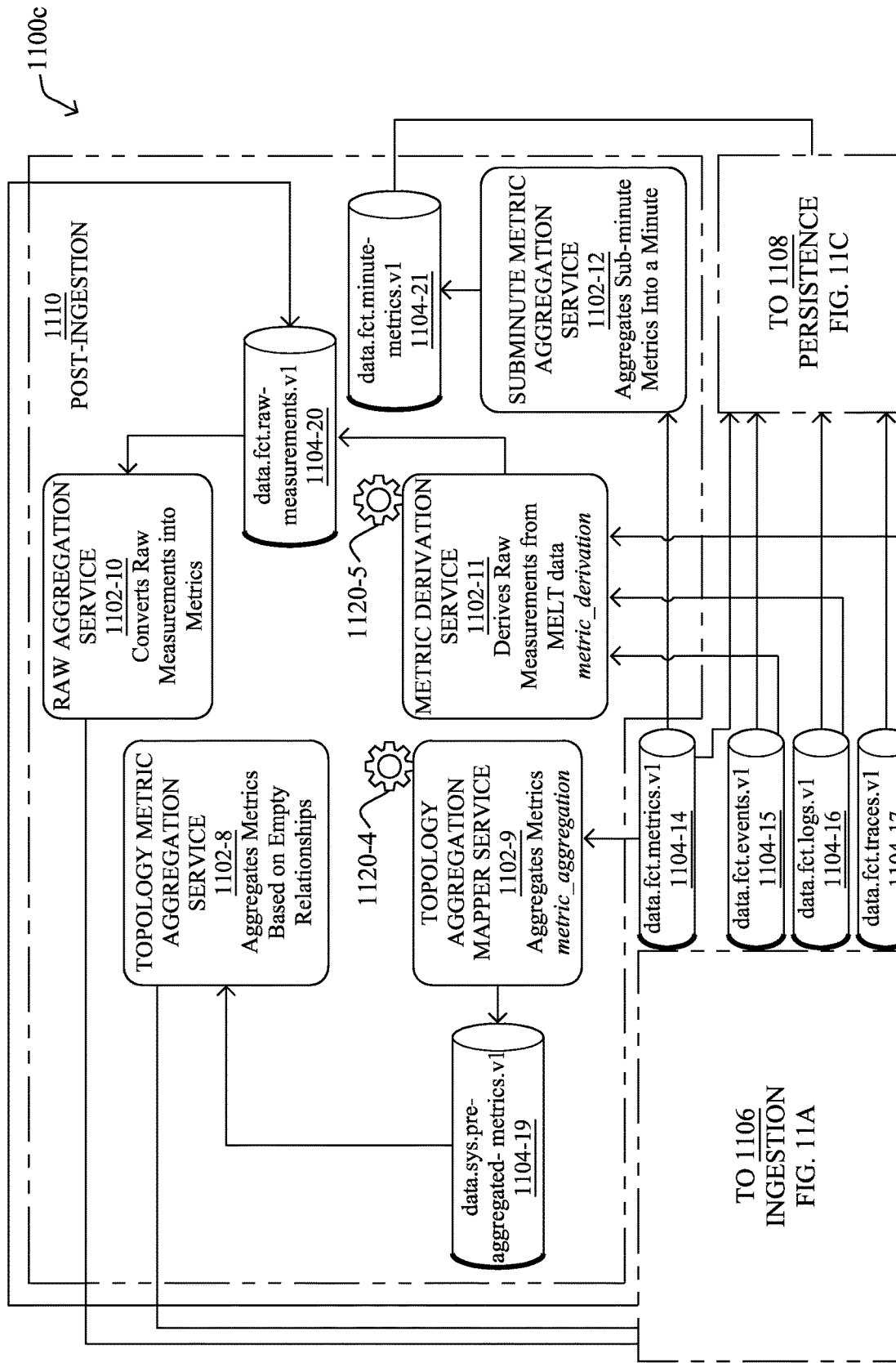
Figure 11E:
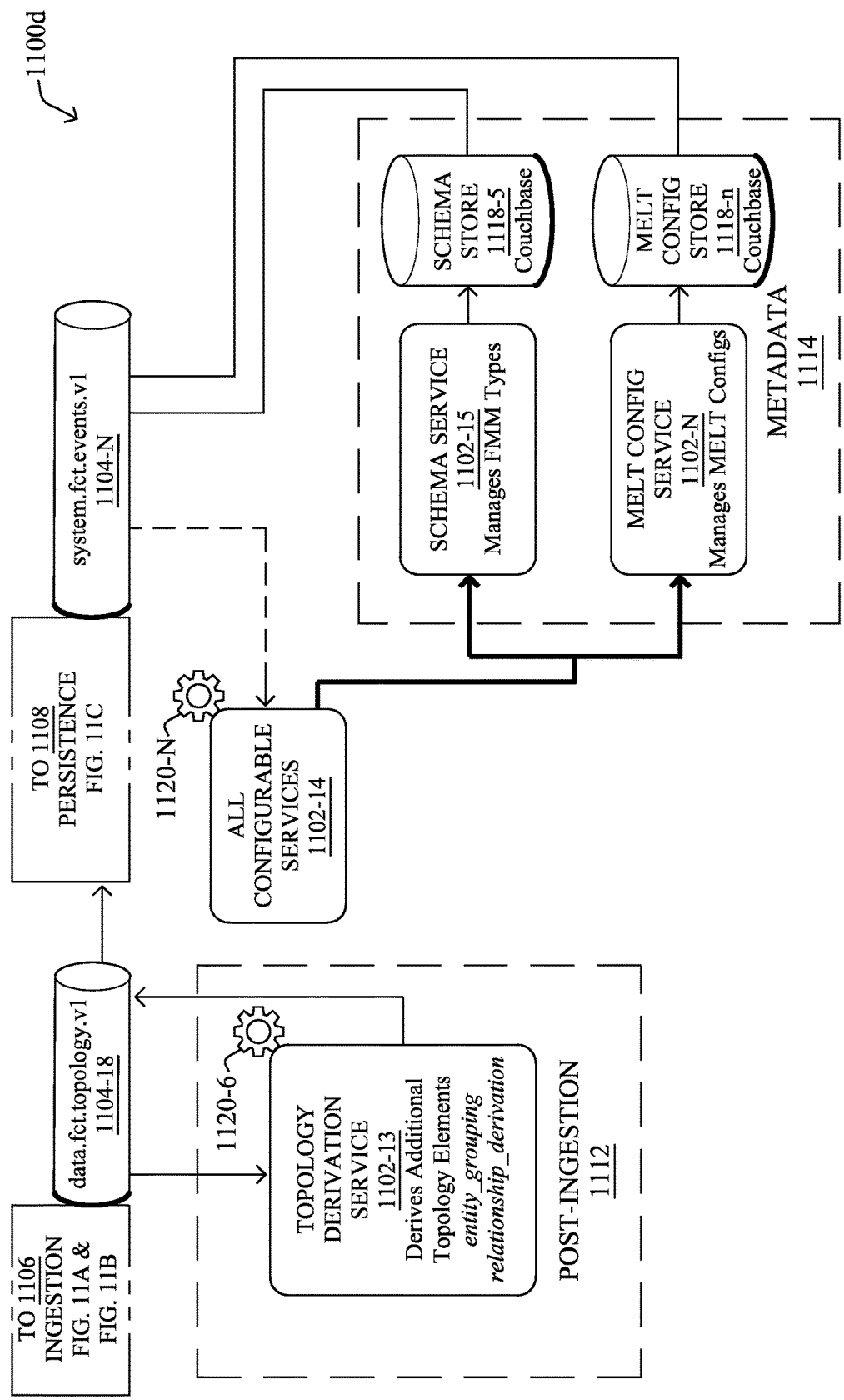

FIGS. 11A-11E illustrate an example of a common ingestion pipeline, e.g., the whole ingestion and transformation process. For clarity purposes, FIGS. 11A-11E each illustrate a respective portion of the entire pipeline. For example, FIGS. 11A-11B collectively illustrate a first quadrant 1100a including an ingestion portion 1106 of the pipeline, FIG. 11C illustrates a second quadrant 1100b including a persistence 1108 portion of the pipeline, FIG. 11D illustrates a third quadrant 1100c including a post-ingestion portion 1110 of the pipeline, and FIG. 11E illustrates a fourth quadrant 1100d including a second post ingestion portion 1112 and a metadata portion 1114 of the pipeline. Each of the quadrants may include transformation steps. These transformation steps may take the form of services 1102 (e.g., 1102-1 . . . 1102-N) or of applications 1116 (e.g., 1116-1 . . . 1116-N) which may include a collection of related services. Each of the quadrants may also include data queues 1104 (e.g., 1104-1 . . . 1104-N) (e.g., Kafka topics) that the steps subscribe to and feed into. Steps with a cogwheel symbol 1120 (e.g., 1120-1 . . . 1120-N) may be controlled by configuration objects, which means that they can be configurable extensibility taps adaptable to new domain models by the mere addition or modification of configurations. Steps with a plug symbol 1122 may include pluggable extensibility taps.

For example, the first quadrant 1100a may include common ingestion service 1102-1 (e.g., associated with rate limiting, license enforcement, and static validation), resource mapping service 1102-2 (e.g., associated with mapping resources to entities, adding entity metadata, resource_mapping, entity_priority, etc.), metric mapping service 1102-3 (e.g., associated with mapping and transforming OT metrics to FMM, metric_mapping, etc.), log parser service 1102-4 (e.g., associated with parsing and transforming logs into FMM events, etc.), span grouping service 1102-5 (e.g., associated with grouping spans into traces within a specified time window, etc.), trace processing service 1102-6 (e.g., associated with deriving entities from traces and enriching the spans, etc.), and/or tag enrichment service 1102-7 ((e.g., associated with adding entity tags to MELT data and entities, enrichment, etc.).

In addition, this quadrant may include data.fct.ot-raw-metrics.v1 data queue 1104-1, data.fct.ot-raw-logs.v1 data queue 1104-2, data.fct.ot-raw-spans.v1 data queue 1104-3, data.sys.raw-metrics.v1 data queue 1104-5, data.sys.raw-logs.v1 data queue 1104-6, data.sys.raw-spans.v1 data queue 1104-7, data.fct.raw-metrics.v1 data queue 1104-8, data.fct.raw-events.v1 data queue 1104-9, data.fct.raw-logs.v1 data queue 1104-10, data.fct.raw-traces.v1 data queue 1104-11, data.fct.processed-traces.v1 data queue 1104-12, data.fct.raw-topology.v1 data queue 1104-13, data.fct.metrics.v1 data queue 1104-14, data.fct.events.v1 data queue 1104-15, data.fct.logs.v1 data queue 1104-16, data.fct.traces.v1 data queue 1104-17, and/or data.fct.topology.v1 data queue 1104-18.

The second quadrant 1100b may include metric writer application 1116-1 (e.g., associated with writing metrics to the metric store 1118-1 (e.g., druid)), event writer application 1116-2 (e.g., associated with writing events to the event store 1118-2 (e.g., dashbase)), trace writer application 1116-3 (e.g., associated with writing sampled traces to the trace store 1118-3 (e.g., druid)), and/or topology writer 1116-N (e.g., associated with writing entities and associations to the topology store 1118-4 (e.g., Neo4J). Additionally, this quadrant may include system.fct.events.v1 data queue 1104-N.

The third quadrant 1100c may include topology metric aggregation service 1102-8 (e.g., associated with aggregating metrics based on entity relationships, etc.), topology aggregation mapper service 1102-9 (e.g., associated with aggregating metrics, mertic_aggregation, etc.), raw measurement aggregation service 1102-10 (e.g., associated with converting raw measurements into metrics, etc.), metric derivation service 1102-11 (e.g., associated with deriving measurements from melt data, metric_derivations, etc.), and/or sub-minute metric aggregation service 1102-12 (e.g., associated with aggregating sub-minute metrics into a minute, etc.). Additionally, this quadrant may include data.sys.pre-aggregated-metrics.v1 data queue 1104-19, data.fct.raw-measurements.v1 data queue 1104-20, and/or data.fct.minute-metrics.v1 data queue 1104-21.

The fourth quadrant 1100d may include topology derivation service 1102-13 (e.g., associated with deriving additional topology elements, entity_grouping, relationship_derviation, etc.), all configuration services 1102-14, schema service 1102 (e.g., associated with managing FMM types), and/or MELT config service 1102-N (e.g., associated with managing MELT configurations, etc.). In addition, this quadrant may include schema store 1118-5 (e.g., couchbase) and/or MELT config store 1118-N (e.g., couchbase).

Other components and interconnections/relationships may be made in a common ingestion pipeline architecture. The views and products illustrated in FIG. 11A-11E are shown herein merely as example implementations that may be used to provide and/or support one or more features of the techniques herein.

A typical example of rule-driven transformation is the mapping of the Open Telemetry Resource descriptor to an entity in the domain model. The Resource descriptor contains key-value pairs representing metadata about the instrumented resource (e.g., a service) that a set of observed data (e.g., metrics) refers to. The task of the Resource Mapping Service is to identify the entity, which the Resource descriptor describes, and to create it in the Topology Store (which stores entities and their relations) if it isn't known yet.

FIG. 12 illustrates an example of resource mapping configurations 1200. In particular, the three specific examples for a resource mapping configuration are, essentially:

1210: For service instances, copy all matching attribute names to properties and remaining to tags (match by convention);

1220: Copy all attributes starting with "service." to entity properties—copy remaining to tags;

1230: Define specific mappings for entity attribute and tags.

As shown in FIG. 12, an expression "scopeFilter" is used to recognize the input (i.e., records not matching the scope filter are ignored) and "fmmType" assigns an entity type to the resource if it is recognized. The mappings rules then populate the fields of the entity (as declared in the domain model) with content derived from the OpenTelemetry content. Thus, the resource mapping configuration refers to, and complements, the domain model, enabling individual tenants to observe and analyze the respective entities in their own system landscape regardless of whether the extensibility platform (e.g., the observability intelligence platform above) supports these entity types as part of the preconfigured ("out of the box") domain models.

The totality of these models and configurations can be considered as one composite multi-level model. Composite in the sense that it has parts coming from different organizations (e.g., the observability intelligence platform distributor, customers, third parties, etc.) and multi-level in the sense that the artifacts drive the behavior of different parts of the whole system, e.g., ingestion, storage, User Interface, etc. Since artifacts refer to each other both across origin and across technical level, the reliable operation of the system heavily relies on the JSON store's ability to understand and enforce the consistency of these references.

For the Trace Processing Service, even more flexibility is required. What is shown as a single box in the diagram is actually itself a workflow of multiple processing steps that need to be dynamically orchestrated depending on the respective domain.

The description below provides greater details regarding the Configuration-Driven Data Processing Pipeline.

Regarding embedding custom container images and FaaS, in accordance with the techniques herein, especially in the complex trace processing workflows, but also in pre-ingestion processing (such as the enrichment of observed data with geographic information derived from IP addresses), some required transformations are too sophisticated for generic rule-driven algorithms. In such cases, the customer must be able to provide their logic as a function that can be executed as a service (e.g., a FaaS) or even a container image exposing a well-defined service interface.

Note that where custom functions are running external to the extensibility platform, the corresponding secrets to access them need to be made available to calling services.

Another security-related problem coming with custom services is that their access may need to be restricted based on user roles. One solution to this is to use custom representational state transfer (REST) endpoints and extensible role-based access control (RBAC) for an extensibility platform.

The extensibility platform herein also illustratively uses a graph-based query engine. In particular, an important precondition for the configuration-driven consumption of customer-specific content is the ability to query data via a central query engine exposing a graph-based query language (as opposed to accessing data via multiple specific services with narrow service interfaces).

Figure 13:
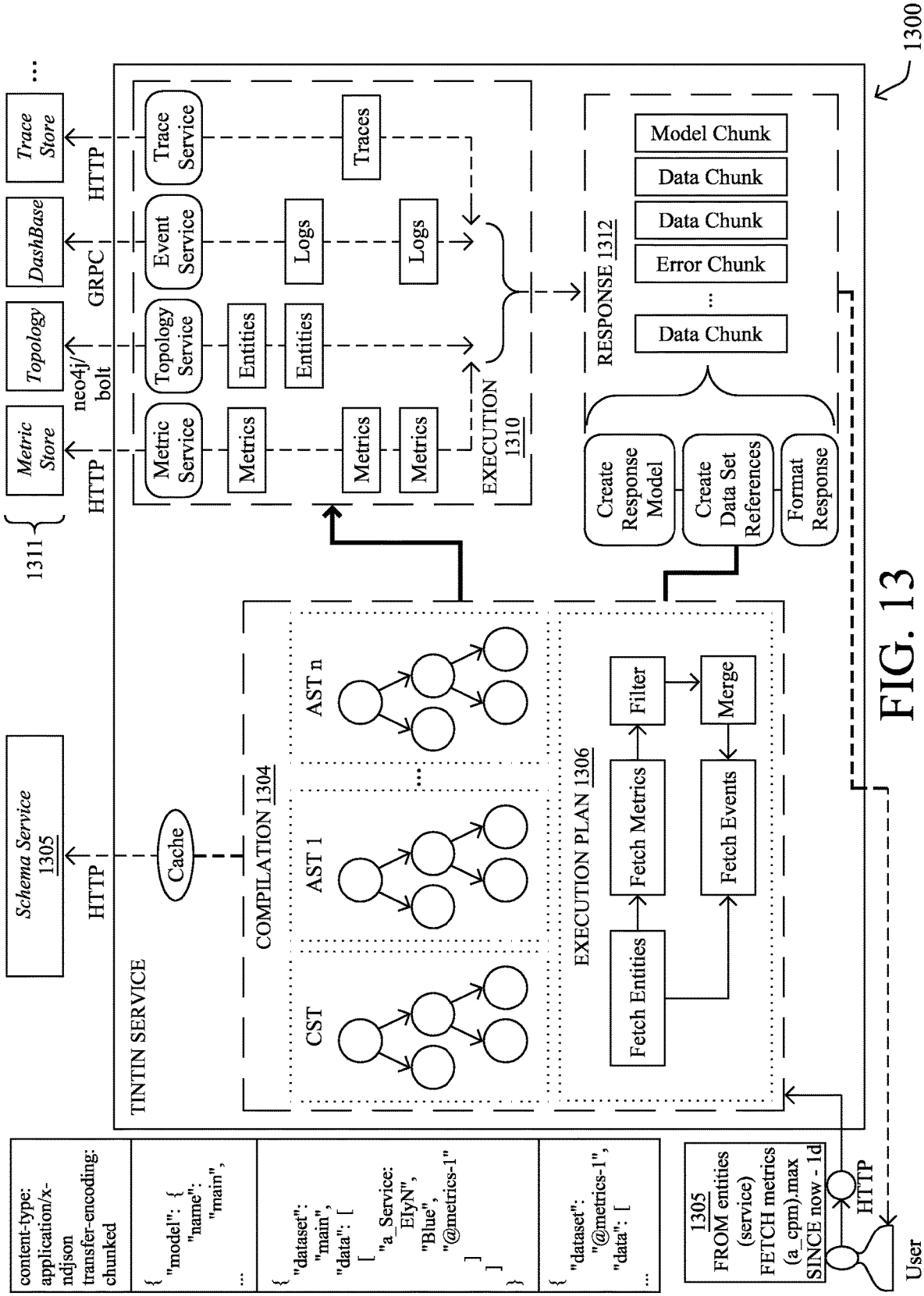
FIG. 13 illustrates an example of a design of a Unified Query Engine (UQE)

FIG. 13 illustrates an example of a design of a Unified Query Engine (UQE) 1300. The Unified Query Engine 1300, in particular, provides combined access to:

Topology (Entities and their relationships);

Metrics;

Events;

Logs; and

Traces.

The Unified Query Engine 1300 may provide the combined access by receiving a fetch request 1302, performing compilation 1304 and determining execution plan 1306. In addition, Unified Query Engine 1300 may execution 1310 and response 1312. Results of performing compilation 1304 and/or execution plan 1306 may be cached with schema service 1305. Results of execution 1310 may be stored in observability stores 1311 which may include a metric store, a topology store, a DashBase store, a trace store, etc. For example, the topology data may be stored in a graph database, and the unified query language (UQL) may allow the platform to identify sets of entities and then retrieve related data (MELT) as well as related entities. The ability to traverse relationships to find related entities enables the application of graph processing methods to the combined data (entities and MELT).

The extensibility platform herein also uses a Configuration-Driven User Interface. In order to allow customers and third parties to create domain-specific UIs without deploying code, the UI is built according to the following principles:

1. No domain knowledge is hard-coded into any UI components.

In particular, no references whatsoever to FMM model content occur in the UI code.

2. Domain knowledge is modeled into UI configurations.

The appearance of the UI, as far as it is domain-specific, is determined by declarative configurations for a number of predefined building blocks.

3. Uniform modeling approach, reusable configurations.

Regardless of the page context (Dashboard, Object Centric Pages (OCP), etc.), the same things are always configured in the same way. Existing configurations can be reused in different contexts. Reusable configurations declare the type of entity data they visualize, and reuse involves binding this data to a parent context.

4. Dynamic selection of configurations.

On all levels, configurations can be dynamically selected from multiple alternatives based on the type (and subtype) of the data/entity to which they are bound. The most prominent example is the OCP template, which is selected based on the type of the focus entity (or entities).

5. Nesting of configurable components, declarative data binding.

Some components can be configured to embed other components. The configurations of these components declare the binding of their child components to data related to their own input. No extension-specific hard-coded logic is required to provide these components with data. This gives third parties enough degrees of freedom to create complex custom visualizations.

6. Limited Interaction Model.

In contrast to the visualization, third parties have limited ways to influence the behavior of the application. The general Human Computer Interaction mechanics remain the same for all applications. For example, it is possible to select the "onclick" behavior for a component out of a given choice, e.g., drilldown, set filter, etc.

The extensibility platform herein also uses a Cell-based Architecture. That is, the extensibility platform herein is a cloud-native product, and it scales according to a cell-based architecture. In a cell architecture, in particular, the "entire system" (modulo global elements) is stamped out many times in a given region. A cell architecture has the advantages of limiting blast radius (number of tenants per cell affected by a problem), predictable capacity and scalability requirements, and dedicated environments for bigger customers.

Figure 14:
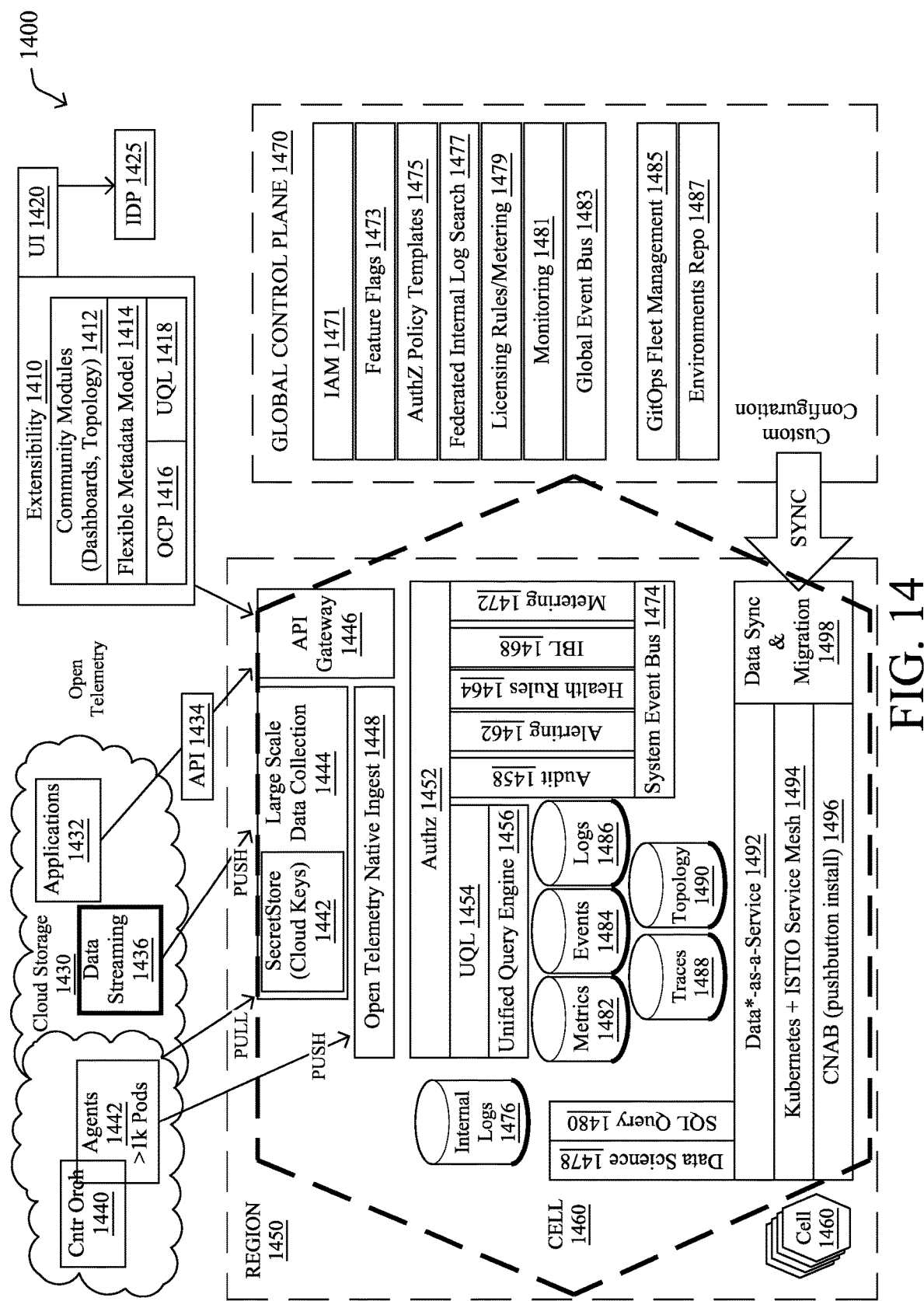
FIG. 14 illustrates an example of a deployment structure of an observability intelligence platform in accordance with the extensibility platform herein, and the associated cell-based architecture.

FIG. 14 illustrates an example of a deployment structure of an observability intelligence platform in accordance with the extensibility platform herein, and the associated cell-based architecture. As shown in extensibility platform diagram 1400, an extensibility platform 1410 has community modules 1412 (dashboards, topology), a flexible meta model (FMM) 1414, an OCP 1416, and a UQL 1418. A UI 1420 interfaces with the platform, as well as an IDP (Identity Provider) 1425. Cloud Storage/Compute 1430 has various Applications 1432 (and associated APIs 1434). as well as Data Streaming services 1436. A Container Orchestration Engine 1440 (e.g., K8s) may have numerous deployed Agents 1442. The MELT data is then pushed or pulled into a particular Region 1450 and one or more specific Cells 1460. Each cell may contain various features, such as, for example:

SecretStore (cloud keys) 1442, Large Scale Data Collection 1444
API Gateway 1446
Open Telemetry Native Ingest 1448
AuthZ (authorization) 1452
UQL 1454
Unified Query Engine 1456
Audit 1458
Alerting 1462
Health Rules 1464
IBL 1468
Metering 1472
System Event Bus 1474
Internal Logs 1476
Data Science 1478
SQL Query 1480
Metrics 1482
Events 1484
Logs 1486
Traces 1488
Topology 1490
data-as-a-service 1492
Kubernetes+ISTIO Service Mesh 1494
CNAB (pushbutton install) 1496
Data Sync & Migration 1498
Etc.

Global control plane 1470 may also contain a number of corresponding components, such as, for example:
IAM (Identity and Access Management) 1471
Feature Flags 1473
Authz Policy Templates 1475
Federated Internal Log Search 1477
Licensing Rules/Metering 1479
Monitoring 1481
Global event bus 1483
GitOps fleet management 1485
Environments Repository 1487
Etc.

Note that the global control plane 1470 passes Custom Configurations to sync into the Cell 1460 (data sync & migration), as shown.

Note that a specific challenge in certain configurations of this model may include the balancing of resources between the multiple tenants using a cell, and various mechanisms for performing service rate limiting may be used herein.

Another specific challenge in this model is in regard to disaster recovery. Again, various mechanisms for disaster recovery may be used herein, as well.

The techniques described herein, therefore, provide for an extensibility platform, and associated technologies. In particular, the techniques herein provide a better product to customers, where more features are available to users, especially as feature development is offloaded from a core team to the community at-large. The extensibility platform provides a clean development model for first party apps (e.g., EUM, Secure App, etc.) and second party apps (e.g., observability, etc.), enabling faster innovation cycles regardless of complexity, particularly as there is no entanglement with (or generally waiting for) a core team and roadmap. The techniques herein also enable a software as a service (SaaS) subscription model for a large array of features.

Figure 15A:
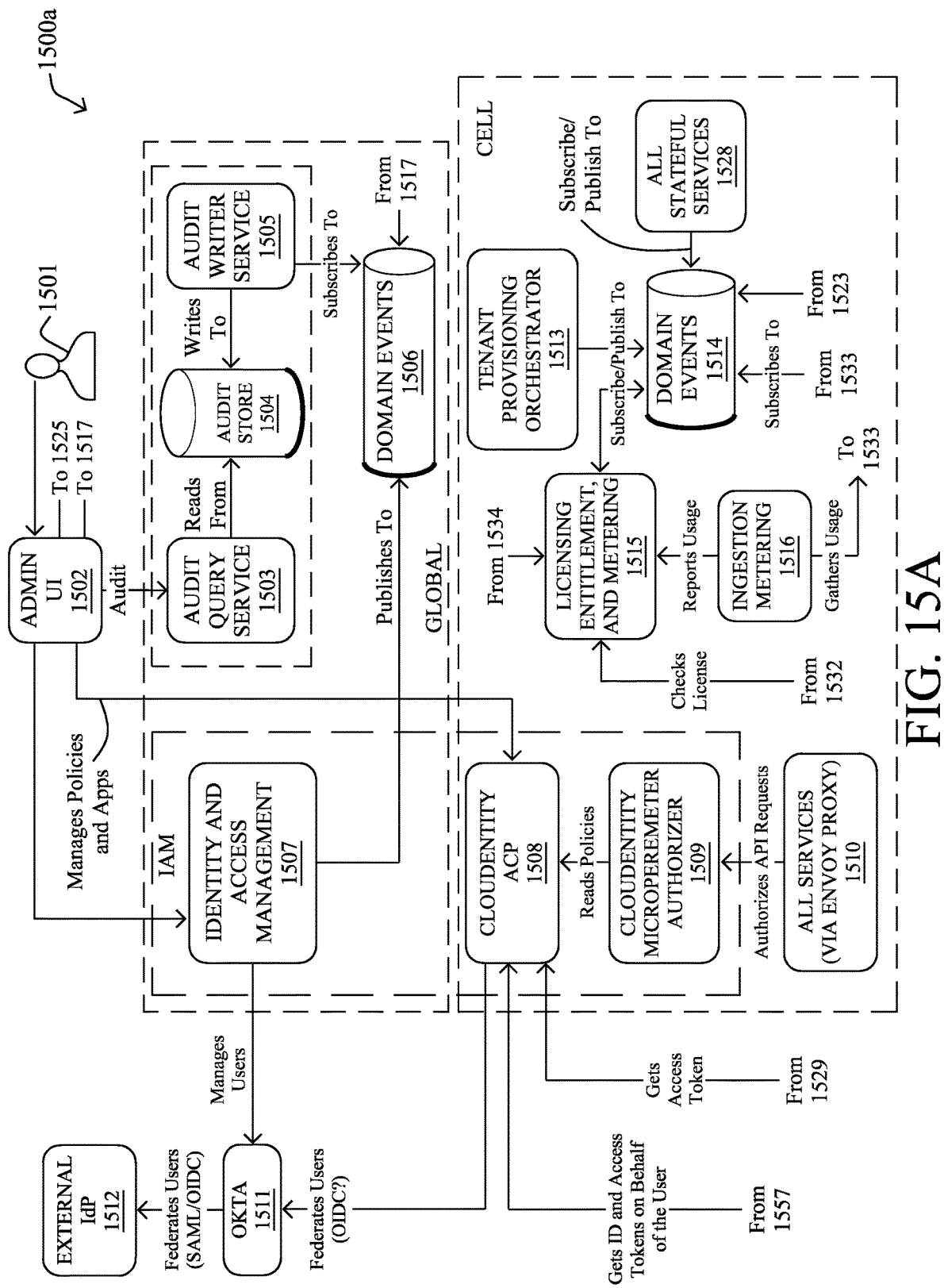
FIGS. 15A-15D illustrate an example of a system for utilizing a configuration-driven data processing pipeline for an extensibility platform, in particular where each of FIGS. 15A-15D illustrate respective quadrants of the system.
Figure 15B:
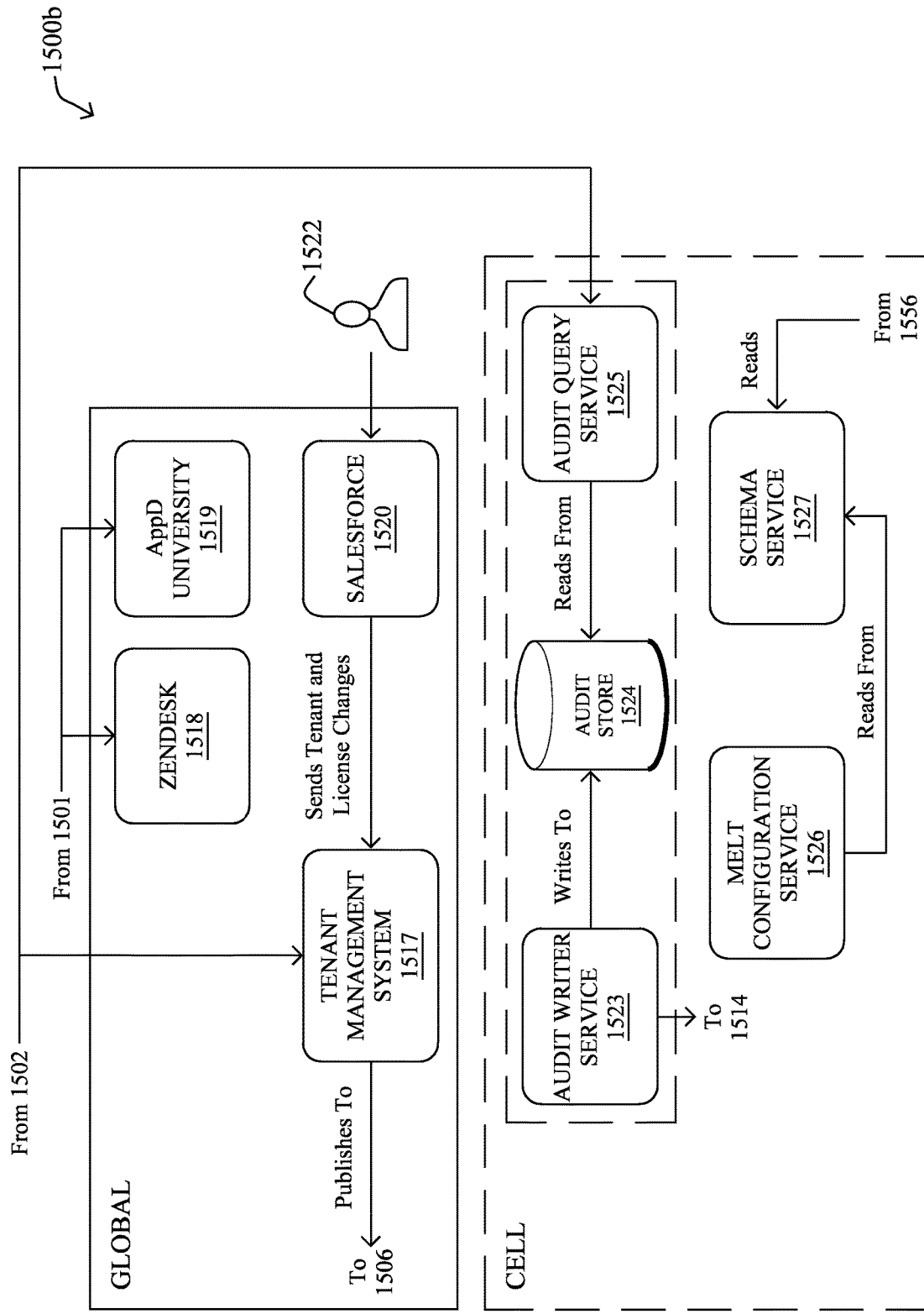
Figure 15C:
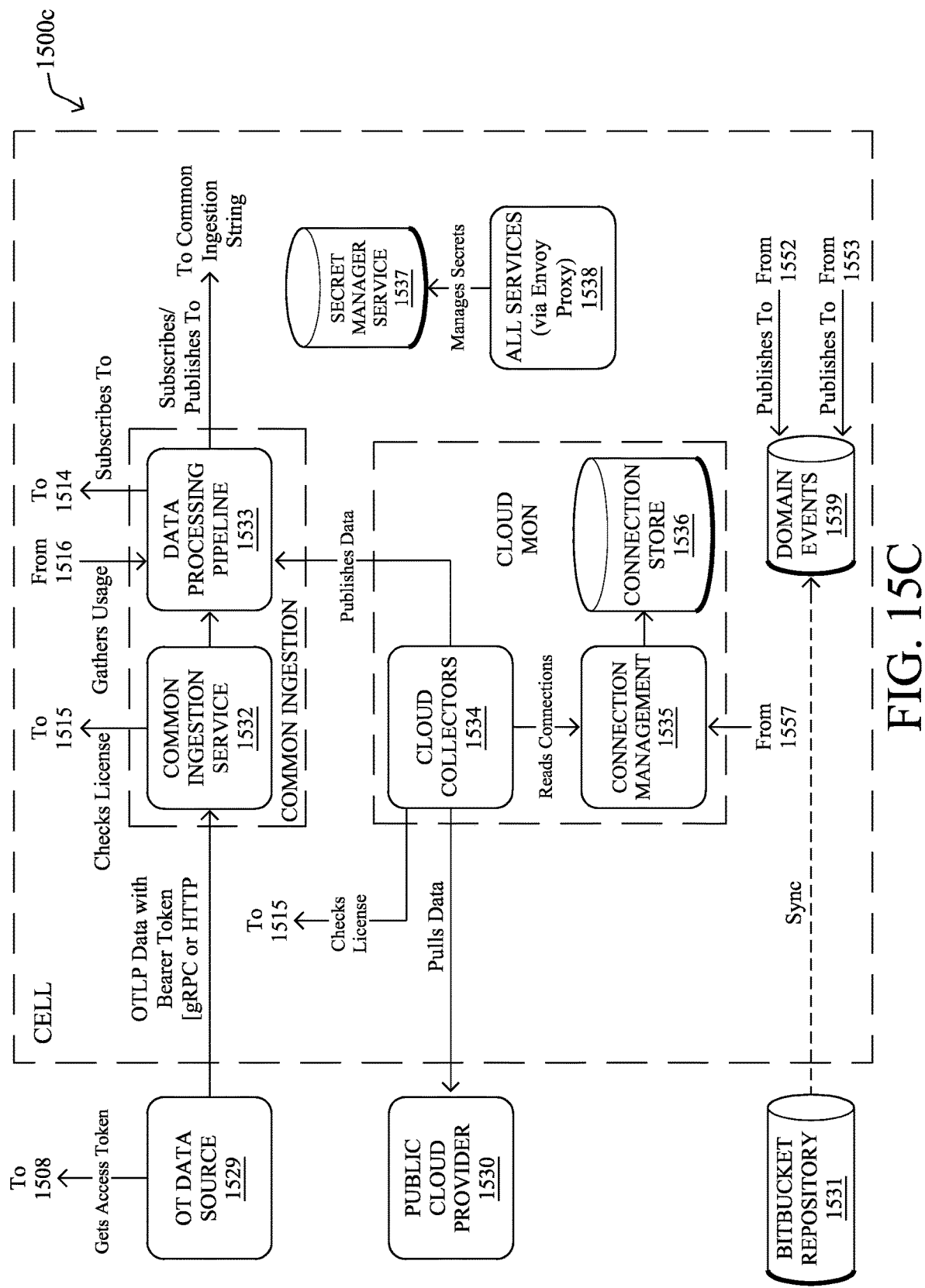
Figure 15D:
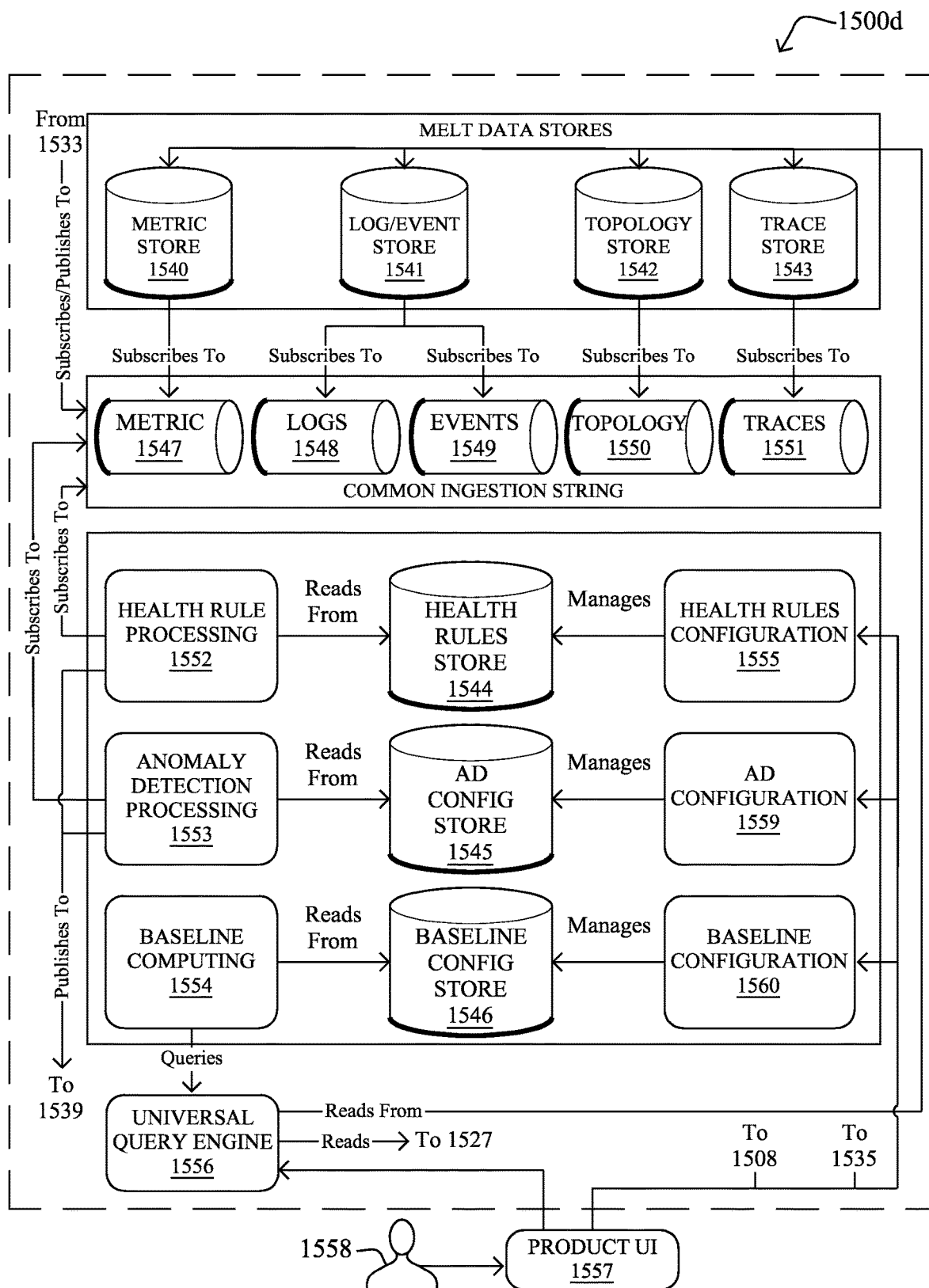

FIGS. 15A-15D illustrate another example of a system for utilizing an extensibility platform. For clarity purposes, FIGS. 15A-15D each illustrate a respective quadrant of the entire system. For example, FIG. 15A illustrates a first quadrant 1500a of the system, FIG. 15B illustrates a second quadrant 1500b of the system, FIG. 15C illustrates a third quadrant 1500c of the system, and FIG. 15D illustrates a fourth quadrant 1500d of the system.

The system may receive input from a customer and/or admin 1501 of the system. via an admin user interface 1502. The system may include a global portion. This global portion may include an audit component. The audit component may include an audit query service 1503 that may allow the querying of an audit log, an audit store 1504 (e.g., dashbase), and/or an audit writer service 1505 that may populate the audit store 1504. In addition, the global portion may include Zendesk 1518 or another component that will support requests, "AppD university" 1519 or another component that will manage training material and courses, salesforce 1520 or another component that allows management of procurement and billing, and/or a tenant management system 1517 for managing tenant and license lifecycle. An "AppD persona" 1522 may interact with salesforce 1520. The global portion may additionally include domain events 1506 for global domain events and identity and access management 1507 that facilitates management of users, application, and their access policies and configure federation.

The system may also include external IdP 1512 which may include a SAML, OpenIS or OAuth2.0 compliant identity provider. The system may include Okta 1511 which may include an identity provider for managed users. In addition, the system may interface with OT data source 1529 which may act as an OT agent/collector or a modern observability agent. In various embodiments, the system may interface with public cloud provider 1530 such as AWS, Azure, GCP, etc. The system may also include BitBucket repository 1531 to produce configs and/or models as code.

In addition to the global portion, the system may also include a cell portion. The cell portion may include a cloudentity ACP 1508 which may operate as an openID provider, perform application management, and/or perform policy management. Further, the cell portion may include cloudentity microperemeter authorizer 1509 for policy evaluation. Furthermore, the cell may include all services 1510 via envoy proxy.

The cell portion may include a second audit component which may include a second audit query service 1525, a second audit store 1524, and/or a second audit writer service 1523. The cell portion may also include a second domain event 1514 for cell domain events. Further, the cell portion may include a tenant provisioning orchestrator 1513, an ingestion meter 1516 that meters ingestion usage, and/or a licensing, entitlement, and metering manager 1515 that facilitates queries of licensing usage, performs entitlement checks, and/or reports on usage. Again, the cell portion may include all stateful services 1528.

The cell portion may include a common ingestion component. The common ingestion component may include data processing pipeline 1533 which may validate and transform data. Data processing pipeline 1533 may also enrich entities and MELT based on configurations. The common ingestion component may also include common ingestion service 1532, which may authenticate and/or authorize requests, enforces licenses, and/or validate a payload.

Moreover, the cell portion may include a common ingestion stream component. The common ingestion stream component may include metrics 1547 (e.g., typed entity aware metrics), logs 1548 (e.g., entity aware logs), events 1549 (e.g., typed entity aware events), topology 1550 (e.g., typed entities and associations), and/or traces 1551 (e.g., entity aware traces). In addition, the cell portion may include a MELT data stores components that includes metric store 1540 (e.g., druid), log/event store 1541 (e.g., dashbase), topology store 1542 (e.g., Neo4j), and/or trace store 1543 (e.g., druid).

In various embodiments, the cell portion of the system may include a cloudmon component, which may include cloud collectors 1534 that collect data from public cloud providers 1530. Additionally, the cloudmon component may include connection management 1535, which may facilitate management of external connections and their credentials. In some instances, the cloudmon component may include a connection store 1536 (e.g., postgreSQL).

The cell portion may also include an alerting component. The alerting component may include a health rule processor 1552 for evaluating health rules and generating entity health events. Further, the alerting component may include a health rule store 1544 (e.g., mongo DB) and/or a health rule configuration 1555 that facilitates the management of health rules. Likewise, the altering component may include an anomaly detection processor 1553 to detect anomalies and/or publish their events, an anomaly detection config store 1545 (e.g., mongoDB), and/or an anomaly detection configuration 1559 that facilitates enabling/disabling/providing feedback for anomaly detection. The alerting component may also include a baseline computer 1554 for computing baselines for metrics, a baseline config store 1546 (e.g., mongoDB), and/or a baseline configuration 1560 to facilitate configuration of baselines.

The cell portion may include a secret manager service 1537 (e.g., HashiCorp Vault) exposed to all services 1538 via envoy proxy. The cell portion may include a third domain event 1539 for cell domain events. In addition, the cell portion of the system may include a universal query engine 1556 that may expose a query language for ad-hoc queries. An end user 1558 may interface with universal query engine 1556 over a product user interface 1557. In addition, the universal query engine 1556 may read from schema service 1527. Schema service 1527 may facilitate querying and management of FMM types. Furthermore, MELT configuration service 1526 may perform configuration of data processing pipeline 1533.

Other components and interconnections/relationships may be made in an example extensibility platform herein, and the views and products illustrated in FIG. 15A-15D are shown herein merely as example implementations that may be used to provide and/or support one or more features of the techniques herein.

Graph-Based Query Engine

The techniques herein extend and/or support the extensibility platform described above by providing a Graph-Based Query Engine (Unified Query Language) component of the platform.

The Unified Query Language (UQL) is a domain-specific language for observation data in the extensibility platform. UQL may be a declarative language. In addition, UQL may be a data query language. In various embodiments, UQL may only support reading and/or may not allow for data modification. UQL may be a domain-specific language for the AppD MELT model. For example, UQL may present MELT data (e.g., metrics, events, logs, traces) and State in the scope of monitored topology. The focus on topology context may be understood as an important differentiator between observability intelligence platforms.

The UQL may utilize individual language building blocks with an expectation of knowledge of the extensibility platform data domain. The following description includes examples of the language of UQL with descriptions and examples, and examples representing formal grammar definitions for UQL.

1. Basics 1.1 Hello World 1 fetch
2 id,
3 attributes ("service.name")
4 from
5 entities (apm:service)

In the above,
1. [fetch] block may define MELT or state data to return.
2. Return ID of selected entities.
3. Return attribute "service.name" of selected entities.
4. [from] block defines topology context of the query- entities and associations.
5. Get data for entities of type [apm:service]

1.2 System of Blocks

Each query may be composed of blocks. Each block may start with a key word and define a selection of some query aspect of domain. In various embodiments, [fetch] may be the only mandatory block.

UQL may support the following blocks: [FETCH], [SINCE], [UNTIL], [FROM], [NAMESPACES], and/or [LIMITS]. A [FETCH] block may define which observation data will be in the response and/or may be the only mandatory block. A [SINCE] block may define the start of a queried time-interval. An [UNTIL] block may define the end of a queried time-interval. A [FROM] block may define a topology of the query (e.g., entities and associations). A [NAMESPACES] block may define default namespaces for types used in the query. A [LIMITS] block may define limits for an array of MELT data. The query may contain blocks in any order. A block keyword may be used in upper or lower case, but, at least in some instances, not in mixed cases.

1.3 Escaping Identifiers and Strings

Identifiers (e.g., types, aliases, etc.) may be used without any escaping if they conform to [[a-zA-Z_] [a-zA-Z0-9_@]*]. Otherwise, the identifiers may need to be quoted by quotation marks ["<identifier>"]. If an identifier contains a ["] character, it may be required to be doubled [" "].

String constants may be required to be quoted by apostrophes ['<string_constant'']. If the identifier contains the ['] character, it may be required to be doubled [' ']. An example quoting is depicted below:

"This is identifier containing spaces, quotation mark" "and dot."
'This is a string constant with apostrophe' 'and dot.'

2. Time Range Definition—SINCE, UNTIL

All queries may run in a defined time range. It may be defined by two blocks—[SINCE] and [UNTIL]. All block keywords may be valid in uppercase, valid in lowercase, but not valid in mixed-case. For example, valid variants may include [since], [SINCE], [until], [UNTIL].

2.1 Absolute Timestamps

Both time range boundaries, [since] and [until], may be defined by absolute timestamps. For example, a timestamp possibility may include an ISO-8601 date-time with offset. For example, the timestamp may be represented as [2021-02-15T16:37:46Z] or [2021-02-15T16:37:46+02:00]. Another timestamp possibility may include an ISO-8601 date only format. For example, the timestamp may be represented as [2021-06-17] or [2021-06-17+01:00]. Yet another timestamp possibility may include an Epoch in milliseconds. For example, the timestamp may be represented as [1623963531547]. In a still further example, the timestamp possibility may include an Epoch in a selected unit such as [s] seconds, [ms] milliseconds, [us] microseconds, etc. For example, the timestamp may be represented as [1623963531s]. In some examples, a timestamp possibility may include using a [now] function. Additionally, a timestamp possibility may include using any above [+–] duration (e.g., as described in additional detail below). For example, the timestamp may be represented as [now –2 h]. Some examples of timestamps are included below:

since 2021-02-15T16:00:00Z until 2021-02-15T16:30:00Z
since now –1 h until now
since 1623963531547 until 1623963531547+1 h 2.2 Durations/Relative Timestamps One of [since/until] blocks may be defined using relative duration to the other. Therefore, the other may be required to be always defined as an absolute timestamp. In various embodiments, duration may be required to be prefixed by the plus [+] or the minus [–] sign. An example of a valid duration format may include an ISO 8601 duration. For example, the duration may be represented as [PT10H] or [P2Y5DT10H]. Another example of a valid duration format may include a Jira-like duration using week, day, hour, minute, etc. For example, the duration may be represented as [2 w 4 d 1 h 11 m] or [2 h11 m]. Additional examples of valid duration formats are included below:

since –1 h until 2021-02-15T16:30:00Z
since 2021-02-15T16:30:00Z until +PT1H
since –1 h until now—1 h 2.3 Default Values Default values for [SINCE] and [UNTIL] block may include [SINCE –1H UNTIL now]. It may be possible to define explicitly none and/or only one of these blocks and expect the default from the other.

3. Using MELT Types—NAMESPACES

Most MELT kinds ([entities], [associations], [metrics], and [events]) may be organized using AppD Types defined in the schema. Types may consist of two parts, namespace and type name. For example, [apm] as the namespace and [service] as the type name. Types are often used in UQL queries. The correct syntax may be [<namespace>:<name>]. For example, the correct syntax may be [apm:service]. Some examples of correct syntax are included below:

FETCH
    metrics(apm:calls_per_minute),
    events(common:logs)
FROM entities(apm:service)

3.1 NAMESPACES Block

It may be possible to use the [NAMESPACES] block to define a comma-separated list of default namespaces for used types in the query. In such a case, types may be specified only as type names without namespaces and colon. The system will evaluate it against a defined list of used namespaces. An example of a [NAMESPACES] block is included below:

NAMESPACES apm, common
FETCH
    metrics(calls_per_minute),
    events(logs)
FROM entities(service)

If the system detect that used type names are defined in multiple specified namespaces, then the query may fail.

All block keywords may be valid in uppercase, valid in lowercase, but not valid in mixed-case. For example, valid variants may include [namespaces] and/or [NAMESPACES]. Namespaces defined within [namespaces] block may be applied only to object types in the query, not to object IDs.

In various embodiments, Object type=a pair [<namespace>:<type>], for example [k8s:pod].

In addition, Object ID=a triplet [<namespace>:<type>:<ID>], for example [k8s:pod:DLT6XSeFMpqQxZIZ18mYkw].

In some instances, an Object ID may represent one concrete object and a UQL user should use object ID unchanged. In additional embodiments, Object ID may represent more than one concrete object and/or a UQL user may not need to use object ID unchanged Examples of namespace K8 application are included below:

Namespace k8s will be applied to type name pod:
    NAMESPACES k8s
    FETCH id
    FROM entities(pod)
Namespace k8s won't be applied to incomplete objectID pod:DLT6XSeFMpqQxZIZ18mYkw
    NAMESPACES k8s
    FETCH attributes
    FROM entities(pod:DLT6XSeFMpqQxZ1Z18mYkw)

3.2 Default Values

Default values for the [NAMESPACES] block may include [NAMESPACES common].

4. Filters

It may be possible to filter objects—[entities], [metrics], [events]—by comparing their scalar fields or facts with constants. All supported object types may have their own fields—named atomic information that can be returned. For example [id], [raw], [value]. If the field has a scalar type (not array or object), then it may be used to filter. It is also possible to use some facts for filtration. Facts may include fields indirectly associated with the filtered object. For example, attribute or tag of a given name may be used.

For example, an example feature implementation may include [entities]— implemented, [metrics]—implemented, [events]—filtering supported on attributes. Filter expressions may be located after any function that returns a set of objects and is quoted in square brackets [[ ]]: [<identify set of objects>[<expression>]]. However, additional embodiments may include additional and/or other feature implementations.

In various embodiment, examples of supported operations may include: [&&] Logical and—[<expression>&& <expression>], [=] equals [<field_identifier>=<constant>], [!=] not equals—[<field_identifier>!=<constant>], [<] less than—[<field_identifier><<constant>], [>] greater than— [<field_identifier>><constant>], [<=] less or equals— [<field_identifier><=<constant>], [>=] greater or equals— [<field_identifier>>=<constant>], and/or [in] or [IN] equals to one of alternative values—[<field_identifier> in [<constant1>, <constant2>, . . . , <constantN>]]. Additional embodiments may include additional and/or other supported operations.

Example—Get service with a name Foo:
    FETCH id
    FROM entities(apm:service)[attributes("service.name")= 'Foo']

5.0 Topology Context—FROM

Topology (entities and associations) may include a designed concept to organize MELT (metrics, events, logs, traces) data. Most of the observation (MELT) data may be assigned to some entity and may be consumed in its context. Entities may also provide state information (for example attributes or tags). Entities may be organized using associations—e.g., the oriented edge between two entities.

Entity types may support inheritance. For example, [k8s: cronjob] extends [k8s:workload]. This may represent a unique differentiator from other AppD types. The topology context of the query may be defined in the [FROM] block.

All block keywords may be valid in uppercase, valid in lowercase, but not valid in mixed-case. Valid variants may include [from], [FROM].

5.1 Entities

In various embodiments, all entities of provided type(s) may be listed by: [entities(<entityType>[, <entityType> . . . ])]. All entities of provided ID(s) may be listed by: [entities(<entityID>[, <entityID> . . . ])].

Example—List IDs of all k8s clusters:
    FETCH id
    FROM entities(k8s:cluster)

Example—List IDs of all k8s clusters and Workloads:
    FETCH id
    FROM entities(k8s:cluster, k8s:workload)

Example—List attributes of the specified entity:
    FETCH attributes
    FROM entities(k8s:cluster: 9SsSYDbUPpeImC18gTP0Iw)

The entity type system may support entity type inheritance. The [entities(<type>)] function may return all entities of the given type and all subtypes. In addition, [fetch id from entities(apm:backend)] may return entities of [apm:backend], [apm:custom_backend], [apm:database_backend], and/or [apm:http_backend] types.

5.2 Associations and Associated Entities

Associations may be typed, oriented edges between entities. In various embodiments, UQL may select associations only from entities. Associations may not have assigned observations. The only reason to use may be to find entities on the opposite side. But there may be a potential to enrich associations also with observations. Therefore, these may be directly supported in UQL.

For example, [<entity_function>.out([type1, type2, . . . ])]—may get outgoing association of specified type(s) from specified entity(ies). If type is not specified, then all outgoing associations may be returned. Additionally, [<entity_function>.in([type1, type2, . . . ])]—may get incoming association of specified type(s) to specified entity(ies). If type is not specified, then all incoming associations may be returned. Further, [<entity_function>.out ([type1, type2, . . . ]).to([type1, type2, . . . ])]—may get entities on the opposite side of the outgoing association(s). It may be possible to specify an also requested entity type(s). Furthermore, [<entity_function>.in([type1, type2, . . . ]).from([type1, type2, . . . ])]—may get entities on the opposite side of the incoming association(s). It may be possible to specify an also requested entity type(s).

Example—Get Kubernetes namespaces of a given cluster:
    fetch id
    from
        entities(k8s:cluster:8oWfRTQ9PBiOzEuRTleRug)
            .out.to(k8s:namespace)

Example—Get Kubernetes cluster for a given namespace:
    fetch id
    from
        entities(k8s:namespace:7ghds179mdsGHb8s).in.from
            (k8s:cluster)

Example—Get all entities (of any type) that are assoicated with a given cluster using "common:has" association:
    fetch id
    from
        entities(k8s:cluster:8oWfRTQ9PBiOzEuRTleRug).out
            (has).to It may also be possible to chain association queries.

Example—Get Kubernetes pods of a given cluster passing all namespaces:
    fetch id
    from
        entities(k8s:cluster:/MAVf/ftO4eYSaU/5v9Jiw)
            .out.to(k8s:namespace)
            .out.to(k8s:pod)

5.3 Alias

It may be possible to "name" the result of the topology query (e.g., [from] block) to reference it from other blocks, for example, the [fetch] block. This name may be referred to as an alias. The usage may include: [<alias>: <topology expression>]. The alias may be formatted as: [[a-zA-Z][a-zA-Z0-9]*]

Example—Use alias in the [from] block:
    fetch cls.id
    from
        cls: entities (k8s:cluster)

5.4 Joins

Traversing between entities using association can be used to define joins. For example, they may define list nodes together with their pods and/or not just pods related to the node. It may be possible to define multiple topology queries, each with its own alias and with cross-referencing.

Syntax—Inner Join:
    <alias_1>: <topology query>,
    <alias_2>: <alias_1>.<topology_query>,
    <alias_N>: <alias_*>.<topology_query>

The result of such query may be an array of tuples containing all aliases. This syntax may define an inner join. In some embodiments, all aliases in all tuples may have non-null entities. Therefore, if k8s nodes are listed with their pods then nodes without any pod may not be in the result. In other embodiments, this may not be the case and results may include nodes without any pods and/or other nodes.
Example—List nodes with their pods:
   fetch
      n.id,
      p.id
   from
      n: entities(k8s:node),
      p: n.out.to(k8s:pod)

The result may be an array of pairs—[node-ID, pod-ID]. Therefore, each node may be in the result as many times as the number of its pods.

5.5 Left Joins

Joins may provide the ability to get nodes together with their pods. However, nodes without pods may not be included until a Left Join is utilized.
Example—List nodes with their (optional) pods:
   is fetch
      n.id,
      p.id
   from
      n: entities(k8s:node),
      p?: n.out.to(k8s:pod)

A distinguishing characteristic is the [?] mark at [p] alias. The [?] mark may signify that pods are optional. The query may return [node-ID, pod-ID] pairs for all nodes and their pods (e.g., the same as for Joins). Further, the query may return [node-ID, null pairs] for all nodes which have no pod. Therefore, this Left Join query (e.g., immediately above) returns all nodes while the Join query (e.g., two above) above returns only nodes with at least one pod.

6. FETCH—Specify Observation Fields to Return

[FETCH] may be the only mandatory block, and it may specify what observations should be returned and how to order its fields. Many observations may be of the complex type (e.g., arrays of tuples). UQL may models it as tables where some fields can have another (e.g., nested) table as its value. This may signify that the field has a complex type.

Supported field types may include: [number]; [string]; [boolean]; [scalar]— where values can be one of [string], [number], or [boolean]; [object]—where the value is some object, the format is unknown to UQL, such fields can be only retrieved, and/or it is not possible to filter, order, etc. based on its values; [timestamp]—with a timestamp in ISO format; [type]—such as namespace:typeName format from AppD schema; [complex]—such as a nested table; [timeseries]—it is a [complex] type, that has one [timestamp] field. Very specific type for the observation domain.

All block keywords may be valid in uppercase, valid in lowercase, but not valid in mixed-case. Valid variants may include [from], [FROM].

Specifying a [fetch] block may be accomplished as follows. A fetch block may contain a comma-separated list of observation fields. UQL may support functions to retrieve particular fields and syntax to filter them. Functions may be executed on topology objects (entities) defined in the [FROM] block. Some functions may be defined also on the [topology universe] and these can be used in queries without [from] block.
Example Specification:
   FETCH
      id,
      attributes("service.name"),
      metrics(calls_per_minute)
   FROM entities (service)

In various embodiments, brackets may be optional. For instance, functions and fields may be the same constructs in UQL. If a function has no parameter, its parentheses may be omitted. For example, [id] and [id( )] may be the same functions/fields.

6.1 Fetch Complex Fields

UQL results may provide support for nested complex types (e.g., nested tables). Its model may always specify structure up to primitive fields. Implicit and explicit options may be used to control what fields of the complex type are to be included in the response.

The implicit option may include an opinionated set of fields for a given observation type. If a function maps to a complex type, UQL may provide a selected set of its fields to return. Those may not include all fields, but rather the most important fields for the most known use-cases. For example, [metrics("calls_per_minute", "infra-agent")] may return [timestamp, value].

The explicit option may include specifying a single field or use curly brackets to specify selected fields. If the function maps to a complex type, then a set of fields may be specified in curly brackets appended to the function call. Another possibility is to specify only a single field after dot. For example, [metrics("calls_per_minute", "infra-agent").max] may return only [max] value. [metrics("calls_per_minute", "infra-agent"){timestamp, min, max}] may return specified fields.

6.2 Fetch Observations—Topology State

Topology may be an AppDynamics specialty added to the MELT model. Topology may maintain and provide state observations. Therefore, state observations may be accessible only on specified topology and the query may be required to contain the [from] block.

An entity object, including an id: string, attributes: complex, and/or attributes (<attribute_name>): scalar may be associated with an attributes object include name: string, value: scalar, and/or source: string.

Bolt fields may be returned by default for a complex type. If a function has a type complex then the diagram may contain its specification in the associated object of the same name.
Example Get ID and two selected attributes:
   FETCH
      id,
      attributes("service.name"),
      attributes("service.namespace"),
   FROM entities (service)
Example Get ID and all attributes as nested tables:
   FETCH
      id,
      attributes
   FROM entities (service)

7. Aggregation Queries

Aggregation queries may allow users to compute values from groups of entities. These queries may provide a way to answer questions such as: how many nodes are in a cluster, how many pods are healthy/unhealthy per namespace, how many workloads of different type are there, etc. A query may become an aggregation query when an aggregation function is used within the FETCH clause.

Supported aggregation functions may include [count]. [count] may count the number of entities in a group. Currently, only topology aggregations are supported. Meaning that you can aggregate entities but not MELT data. While in some embodiments, only topology aggregations are supported meaning that entities may be aggregated but not MELT data, in other embodiments other aggregations are supported and MELT data and/or other data may be aggregated.

7.1 Aggregating Everything

A straightforward aggregation query may be to count everything. In the FETCH clause, if you ask for a [count] a single number may be returned that represents how many results there are matching your FROM clause:

Count Aggregation:
    FETCH
        count
    FROM
        entities (k8s:pod)

7.2 Aggregating and Grouping

Aggregations may be further divided by using topology observations in the FETCH clause along with aggregation functions. Such observations may be referred to as grouping keys in an aggregation query.

Example of grouping on entity attributes:
    FETCH
        count,
        attributes (region)
    FROM
        entities (k8s:cluster)

Grouping keys split the set of all results into separate groups where entities in the same group have the same values for all grouping keys. Aggregation functions are applied on each group individually. Grouping is done on the grouping key values and will result in as many results as there are distinct grouping key values (which may even be 0). This is the same behavior as in SQL or Cypher.

The previous example query may split all clusters into as many groups as there are distinct regions and then return for each region a tuple of the region and the number of clusters with that region value. Adding more grouping keys may result in more fine-grained division of the results.

Example of grouping with multiple keys:
    FETCH
        count,
        attributes ("k8s.cluster.name"),
        attributes ("k8s.namespace.name")
    FROM
        entities (k8s:pod)

This query may return the number of pods per cluster and namespace. Each resulting tuple may contain a cluster name, a namespace name, and/or a count of pods with these cluster and namespace names.

Some examples of supported grouping keys may include [attributes(<attribute-name>)]—group by entity attribute, [tags(<tag-name>)]—group by entity tag, [type]—group by entity type. Additional grouping keys may also be supported although not explicitly listed. Grouping keys may be automatically returned as part of the results and may not be able to be omitted. In some embodiments, complex types such as all attributes and/or all tags may be supported as grouping keys.

Example of grouping with different key types:
    FETCH
        count,
        type,
        attributes ("health.status"),
        tags ("cloud.region")
    FROM
        entities (k8s:workload)

In various embodiments, in an aggregation query all items in the FETCH clause may either be aggregation functions or supported grouping keys. However, in additional embodiments, in an aggregation query items in the FETCH clause may not be aggregation functions and/or may include additional grouping keys.

7.3 Result

The result of aggregation queries may be tuples. The tuples may contain values for grouping keys and aggregation functions. Take a particular example URL Query such as:

Example URL query:
    FETCH
        c: count,
        t: type,
        h: attributes ("health.status"),
        r: tags ("cloud.region")
    FROM
        entities (k8s:workload)

From this, the following data may be produced: [c]—a non-negative integer; [t]—namespace:typeName format from AppD schema; [h]—a long (the attribute's type); and/or [r]—string (tag values are string). When grouping on attributes or tags not all entities may have a value for a grouping key. Such entities may be counted in tuples that have null values.

8. Metrics—The Metrics ( ) Function—Getting the Metric Data

To get metric data, the function [metrics( )] may be used. These functions may be defined by the grammar of Metric Rule. This function may provide a way to retrieve metric time series and/or metric data rollup into a single scalar value. Additionally, it may be possible to slice metric data by dimensions, filter metric data by dimension values, get metric data for all the sources, and/or perform arithmetic metric expression calculations.

Example URL query:
    FETCH
        serviceId: id,
        metrics(calls_per_minute, infra_source)
            [attributes(region) IN ['pdx', 'fra']]
            {timestamp, value, max}
    FROM
        entities(service_type)
    LIMITS
        metrics.granularityDuration(PT5M)

8.1 Supported Metric Consumption Functions

The supported consumption functions may be defined by the grammar of the metric consumption function rule. This grammar may include a min, max, etc.

8.2 Parameters, fields, filters
    metrics(<metric-type>, <source>)[<filter-expression>]
        {<fields>}
    metrics(<metric-type>, <source>)[<filter-expression>].<field>

8.2.1 Parameters

The supported parameters may be defined by the grammar of the metric specifier rule. The parameters may include [<metric-type>] (e.g., which may be mandatory): this being the metric type that identifies the metric, e.g., [common: calls_per_minute]. The parameters may also include [<source>] (e.g., which may be optional): this being the source that identifies the metric, e.g., [infra-agent]; if omitted, the returned metric data may be grouped per available source.

8.2.2 Filter Expression

The supported expressions may be defined by the grammar of the metric filter expression rule. The filter expression may allow setting criteria for the dimensions. Example possibilities include to filter for values of attributes (e.g., [attributes("location")]), tags (e.g., [tags("my-tag")]), source (i.e., [source]) and/or to use operators: equality [=], inequality [!=], [IN [ ]]. For the detailed information, reference may be made to the grammar of the Appd common expression language. For example, The Filter Expression Example:
    FETCH
        metrics(calls_per_minute, infra_source)
            [attributes(region) IN ['pdx', 'fra'] && tags (health)
                !=0 && attributes ("os")='linux']
            {timestamp, value, max}
    FROM
        entities(service_type)

The timeseries of value and max of the calls per minute for the infra_source source may be retrieved. These may be limited to only services in the regions pdx and fra with non-zero health tag and with os equal to linux.

8.2.3 Fields

The supported fields may be defined by the grammar of the metric observation set rule. The fields/field may allow specifying what exact data to get. It is possible to specify, for example, consumption function(s) (e.g., [{max, min}] or just [.sum]), attributes (e.g., [attributes("location")]), tags (e.g., [tags("my-tag-name")]), and/or timestamp (i.e., [timestamp]). For example, The Field(s) Example:
    FETCH
        metrics(logs_per_minute, infra_source)
        {timestamp, count, attributes("severity")}
    FROM
        entities(service_type)

A timeseries of a count of the logs per minute for the infra_source source may be received. The resulting metrics may be sliced per attribute severity, effectively dividing into buckets with severities (e.g., error, warn, etc.).

8.3 Metric Expressions

The supported expressions may be defined by the grammar of the metric observation expression rule. Metric expressions may be utilized to ask a metric store to perform basic arithmetic operations over constants and/or other metrics. The expression calculation may be entirely performed by the metric store.

The arithmetic operations' priority may be applied. Parenthesis may be used to group binary operations as desired. As many distinct metrics as desired may be used in an expression. Constants may be utilized on any side of the binary operation. For example, The Metric Expression(s) Example for time series:
    FETCH
        metrics(errors, infra){timestamp, count}/metrics(calls, infra){timestamp, count}*100
    FROM
        entities(service_type)

The above may return percentages of errors out of all calls.

The Metric Expression(s) Example for inline rollup metric:
    FETCH
        metrics(errors, infra).count/metrics(calls, infra).count*100
    FROM
        entities(service_type)

The above may return percentages of errors rollup value out of all calls.

The Metric Expression(s) Example for referenced rollup metric
    FETCH
        metrics(errors, infra){count}/metrics(calls, infra){count}*100
    FROM
        entities(service_type)

The above may return percentages of errors rollup value out of all calls. Everything which is acceptable for the metrics( ) function may also be valid for metric expressions. However, there may be some limitations such as those described below.

8.3.1 Limitations

Binary operations such as +, −, *, and * may be the only supported operations. Source dimensions may need to be provided and may need to be the same on both sides of the binary operation. Only a single consumption function may need to be provided in the scope of a metric. Filter expressions over metrics within a metric expression may not be allowed. Mixing of the time series metrics with rollup ones in the same expression may not be allowed. Unary operations may not be supported. Only a single entity set may be permitted to be used throughout a particular metric expression.

8.4 Limits

The following discussion includes examples of options to limit the returned metric data. One manner by which returned metric data is limited is to set the maximum number of returned datapoints: [LIMITS metrics.granularityDuration(PT5M)]. The returned time series may contain datapoints of at least 5-minute duration. Another manner by which returned metric data is limited is to set the minimum duration of each of the returned datapoints. For example, [LIMITS metrics.granularityDataPoints(50)]. This may return up to 50 datapoints for all the queried time series of the given time range. All of these examples may be global for the whole UQL query.

8.5 Result

The structure of the result may be determined by what is specified in the parameters and the fields.

8.5.1 Source Parameter [Yes], Timestamp Field [Yes]

When given, the [timestamp] field may be present. Further, the [source] parameter may be present. Then the resulting data may be of [type]: [timeseries], [form]: [reference]. For example, [metrics("common:calls_per_minute", "infra-agent"){max, min, timestamp}]. This may return a time series of max and min followed by each datapoint timestamp of the calls per minute for the infra-agent source. Of note, if fields section is omitted, then it may be equal to [{timestamp, value}], which is also applicable for metric expressions.

8.5.2 Source Parameter [Yes], Timestamp Field [No]

When given, the [timestamp] field may be missing and/or the [source] parameter may be present. Then, the resulting data may be of [type]: [complex] and/or [form]: [reference]. For example, [metrics(common:calls_per_minute, "infra-agent"){max, min}] may return max and min of the calls per minute for the infra-agent source. This may also be applicable for metric expressions that are requesting rollup data, but a metric expression may just accept a single referenced consumption function. For example, [metrics(errors, infra) {count}/metrics(calls, infra){count}*100] may return percentage of errors out of all calls rollup metric.

8.5.3 Source Parameter [Yes], Timestamp Field [No], Single Consumption Function

When given, the [timestamp] field may be missing and/or the [source] parameter may be present. A single consumption function may be connected with [.] when used (e.g., [.max]). Then the resulting data may be of [type]: [number] and/or [form]: [inline] For example, [metrics("common: calls_per_minute", "infra-agent").sum] may return time rollup of sum of the calls per minute for the infra-agent source. This may also be applicable for metric expressions that are requesting rollup data. [metrics(errors, infra).count/metrics (calls, infra).count*100] may return a percentage of errors out of all calls rollup metric.

8.5.4 Source Parameter [No], Timestamp Field [Yes]

When given, [timestamp] field may be present and/or [source] parameter may be missing. Then the resulting data may be of [type]: [complex], [form]: [reference], and/or [fields]: (1) [source] and (2) in-lined 2-dimensional array of metric data of [type]: [timeseries]. For example, [metrics ("common:calls_per_minute"){max, min, timestamp}] may return time series of max and min followed by each datapoint timestamp of the calls per minute grouped per available source.

8.5.5 Source Parameter [No], Timestamp Field [No]

When given, [timestamp] field may be missing and/or [source] parameter may be missing. Then the resulting data may be of [type]: [complex], [form]: [reference], and/or [fields]: (1) [source] and (2) in-lined 2-dimensional array of metric data of [type]: [complex]. For example, metrics ("common:calls_per_minute"){max, min} may return max and min of the calls per minute grouped per available source.

8.5.6 Source Parameter [No], Timestamp Field [No], Single Consumption Function

When given, the [timestamp] field may be missing, the [source] parameter is missing, and/or single consumption function connected with [.] is used (e.g., [.max]). Then the resulting data may be of [type]: [complex], [form]: [reference], and/or [fields]: (1) [source] and (2) in-lined data of [type]: [number]. For example, [metrics("common:calls_per_minute").max] may return a time rollup of max of the calls per minute grouped per available source.

9. Events—the Events( ) Function—Getting the Event Data

To get events, the [events( )] function may be used. The supported functions may be defined by the grammar of the events rule. The function may provide a way to retrieve events as time series, fetch event attributes, fetch event tags, fetch non-MELT properties as generic event fields, filter event data by attribute values, and/or fetch events without specifying FROM topology part.

The Structure of the Events( )Function:
    FETCH
        id,
        events(logs)
            [attributes(severity) IN ['WARN', 'ERROR']]
            {timestamp, raw, attributes, eventFields}
    FROM
        entities(entity.type)

9.1 Events—Parameters, Fields, Filters
    events(<event-type>)[<filter-expression>]{<field>*}
    events(<event-type>)[<filter-expression>].<field>

9.1.1 Parameters

The supported functions may be defined by the grammar of the EventId rule. For example, this may include [<event-type>] (which may be mandatory): the event type that identifies the event e.g., [common:logs].

9.1.2 Filter Expression

The supported functions may be defined by the grammar of the event filter expression rule. The filter expression may allow selection of events with specific attribute values. In various embodiments, filters may be supported only on attributes. However, in some embodiments, filters may be supported beyond only attributes. In some examples, allowed operators may include: equality [=], inequality [!=], and/or set [IN[ ]]. Multiple operators may be joined with [&&]. Additional details may be revealed by referring to the grammar or the Appd common expression language. For example, The Structure of the Events( ) Function:
    FETCH
        events(logs)
            [attributes(severity) IN ['WARN', 'ERROR'] && attributes (cluster) !='dev']
            {timestamp, raw}
    FROM
        entities(pods)

9.1.3 Fields

The supported functions may be defined by the grammar of the event observation set rule. The fields may allow specifying what exact data to get. It may be possible to specify string representation of the original event message (e.g., [raw]), specific attribute (e.g., [attributes("severity")]), all attributes (e.g., [attributes]), specific tag (e.g., [tags("my-tag-name")]), all tags (e.g.,[tags]), other event properties as event fields (e.g., [eventFields]), timestamp (i.e., [timestamp]), and/or source (i.e., [source]). For example, The Field(s) Example
    FETCH
        events(logs)
            {timestamp, attributes("severity"), raw, eventFields}
    FROM
        entities(pods)

9.2 Result

The structure of the result may be determined by what fields are specified. Some values may be in-lined. Other multiline values may be referenced to other data chunks. In-lined values may include [timestamp], [source], [raw], [attributes('single-attribute')], and/or [tags('single-tag')]. Referenced values may include all [attributes], all [tags], and/or all [eventFields].

10. Grammar Description

UQL may utilize a formal grammar for query representation.

10.1 Parser

Representation of the UQL query (e.g., also a starting point of the grammar) may consist of multiple different clauses (blocks) which can be used in arbitrary order. In various embodiments, the only mandatory clause may be [FETCH]. Each clause can be defined within the query at most once. A number of clauses may be checked (and reported in case of error) during semantic analysis. For example, [FROM .. FETCH .. SINCE .. NAMESPACES ..], [FETCH ..], and/or [LIMITS .. NAMESPACES .. FETCH .. FROM .. SINCE .. UNTIL ..].

The parser may rely on definitions by the grammar of the UnifiedQueryLangParser. Parser may utilize a rule namespacesClause, a rule fetchClause, a rule fromClause, a rule topologyMap, a rule fetchedobservationExpression, a rule fetchedObservation, a rule namedFetchedObservation, a rule fetchedObservationAlias, a rule unnamedFetchedObservation, a rule aliasedTopologySet Expression. The topologySetAlias may name the topologySetExpression. It may be used to reference the topologySetExpression (e.g. in FETCH clause). The [?] may define that the expression result is optional (e.g., it is also known as Left Join).

Parser may also utilize a rule topologySetConstructor, a rule entitiySetConstructor, a rule entitiySetConstructorByTypeId, a rule entitySetConstructorByObjectIds, and a rule filterExpression. In the rule filterExpression, the filtering conditions may be encapsulated in square brackets such as, for example, [FROM entities (common:service_instance) [attributes(name) in ['Service1', 'Service2' ]]].

Figure 16:
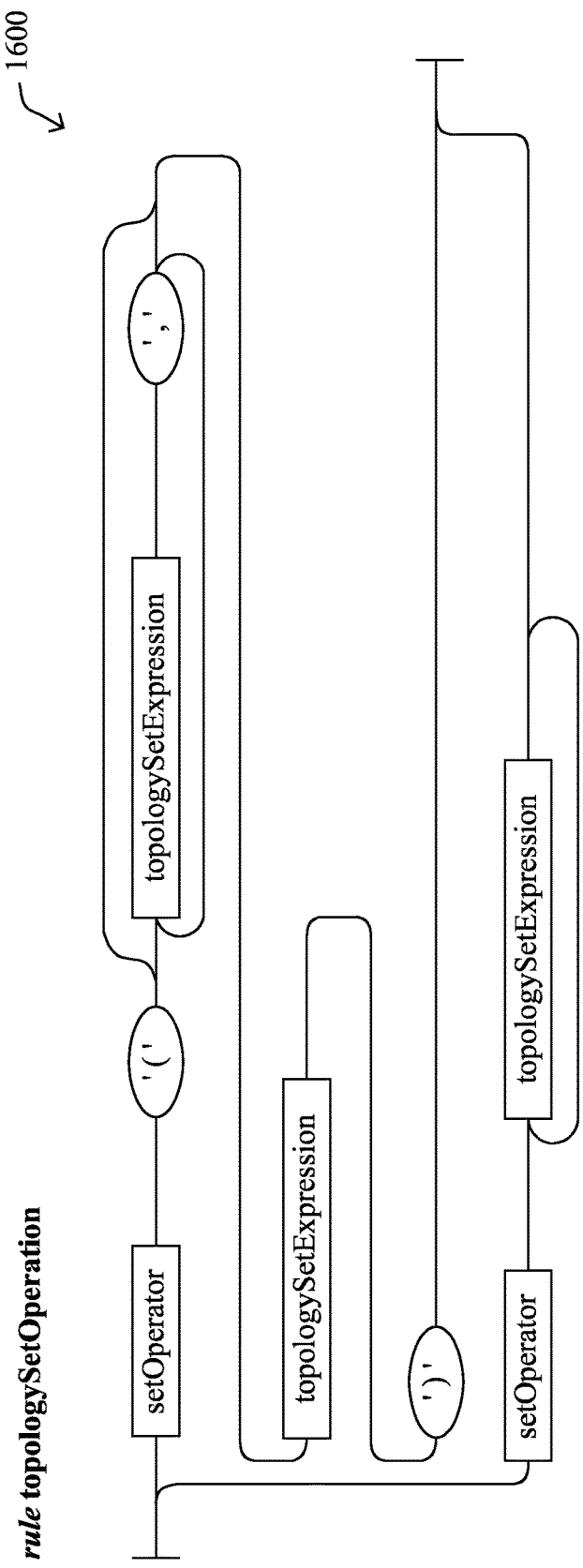
FIG. 16 illustrates an example of a formalized grammar rule for graph-based querying of an extensibility platform.

In addition, parser may utilize rule topologySetOperation. FIG. 16 illustrates an example 1600 of a formalized grammar rule for graph-based querying of an extensibility platform, in accordance with one or more embodiments described herein. The particular formalized grammar rule is the rule of TopologySetOperation. The example 1600 includes a graphical representation of the grammar rule for utilization by a parser to interpret and/or separate out queried language according to the formalized grammar rule of TopologySetOperation. Illustrated examples of other formalized grammar rules are omitted for clarity and/or brevity. However, it should be appreciated that similar examples consistent with the present disclosure are also contemplated and supported herein.

Further, parser may utilize a rule observationExpression, a rule valueObservationExpression, a rule observation, a rule id, a rule type, a rule createdAt, a rule updatedAt, a rule attribute, a rule attributeName, a rule tag, a rule tagName, a rule metric, a rule metricSpecifier, a rule metricId, a rule metricSourceName, a rule metricFilterExpression, a rule metricFilterValueExpression, a rule metric observation, a rule metricTag, a rule metricAttribute, a rule metricSource, a rule metricObservationsSet. Furthermore, parser may utilize a rule consumptionFunction, a rule metricObservationExpression, a rule metricTimestamp, a rule aggregation, a rule compositeObservationExpression, a rule topologySetAliasRef, a rule attributes, a rule tags, a rule sources, rule events, rule eventide, rule eventFilterExpression, rule eventFilterValueExpression, rule filterableEventObservation, rule eventsObservationsSet, rule eventValurObservationExpression, rule eventRaw, rule eventTimestamp, rule eventSource, rule eventAttribute, rule eventAttributes, and rule event Fields. Rule eventField may retrieve additional event properties stored in Dashbase that are neither tags nor attributes. Values may be represented as a map from field name to a single object matching stored dynamic structure. An example result line may include [["foo", {"text": "bar", "offset": {"start": 42, "end":45}}]].

Parser may utilize a rule eventTag, a rule eventTags, rule objectId, rule objectType, rule typeId, rule idValue, rule namespace, rule identifier, the rule setOperator, rule relationOperator, a rule logicUnaryOperator, rule arithmeticOperatorP1, rule arithmetricOperatorP2, rule list, rule constant, rule nullValue, rule number, and/or rule string.

The use of timeranges may allow a user to specify a time interval for a query using SINCE and/or Until clauses. For example, a rule sinceClause, a rule untilClause, a rule timeDefinition, a rule offset, a rule timestamp, a rule duration, and/or a rule timeFunction may be utilized.

The use of limit query blocks may allow a user to specify global limits for granularity and number of fetched observations. Some examples may include metrics granularity and/or number of events. As an example, [LIMITS metrics.granularityDataPoints(20), events.count(100)]. For example, rule limitsClause, rule limitExpression, and/or rule metricsLimit may be utilized. Examples of rule metricsLimit may include [metrics.granularityDataPoints(20)] and/or [metrics.granularityDuration (1 h 10 m)]. In addition, rule granularityDataPoints, rule granularityDuration, rule eventsCount, and/or rule eventsLimit may be utilized. An example of rule eventsLimit may include [events.count (100)].

10.2 Lexer

The lexer may rely on definitions by the grammar of the UnifiedQueryLangLexer. The lexer may utilize rule FETCH with keyword starting FETCH clause of the UQL query, rule SINCE keyword starting SINCE timerange clause of the UGL query, rule UNTIL keyword starting UNTIL timerange clause of the UGL query, a rule NAMESPACES keyword starting NAMESPACES clause of the UQL query, a rule LIMITS keyword starting LIMITS clause of the UQL query, a rule NULL, a rule OBJECT_ID, a rule STRING, and/or a rule INTEGER_VALUE including a representation of an integer number (e.g., [123]).

In addition, the lexer may utilize rule DOUBLE_Value including representation of double-precision floating-point number (e.g., double). It may consist of a sequence of zero or more decimal digits (e.g., "the integer"), optionally followed by a fraction, optionally followed by an exponent. For example, a decimal may be [10.21] or [0.505] or [99.] and/or a double may be [55E-1] or [55.e2] or [55.21e77] or [0.505E-77].

The lexer may utilize rule EXPONENT, rule IDENTIFIER, rule QUOTED_IDENTIFIER, rule BACKQUOTED_IDENTIFIER, rule LETTER, rule BASE64, and/or rule IDENTIFIER_FR. The lexer may utilize rule EPOCH which may include an Epoch timestamp in milliseconds. Examples of rule EPOCH may include [1623963531547].

Additionally, lexer may utilize rule EPOCH_UNITS. EPOCH_UNITS may include epoch timestamps with specified time units (e.g., seconds, milliseconds, and/or microseconds). Examples of rule EPOCH_UNITS may include [1623963531$s$].

Further, lexer may utilize rule ISO_DATE_TIME which may include DateTime timestamp in ISO 8601 format. Examples of rule ISO_DATE_TIME may include [2021-06-17T20:05:40Z], [2021-06-17T20:05:40+01:00], etc.

Furthermore, lexer may utilize rule ISO_CUSTOM_DURATION which may include custom Jira-like time duration for easier usage. Examples of ISO_CUSTOM_DURATION may include [2 W 4 d 1 h 11 m], [100 m], etc.

Lexer may utilize rule ISO_DURATION which may include ISO 8601 formatted time duration. Examples of rule ISO_DURATION may include [P2Y5D], [PT10H], [P2Y5DT10H], etc.

Lexer may utilize rule ZONE_OFFSET which may include a time zone offset used in ISO 8601 formatted timestamps. Examples of rule ZONE_OFFSET may include [+05:00], etc.

Lexer may utilize rule ISO_DURATION_DATE which may include a dated part of ISO 8601 formatted timestamp. Examples of rule ISO_DURATION_DATE may include [99D], etc.

Lexer may utilize rule ISO_DURATION_TIME which may include a time part of ISO 8601 formatted timestamp. Examples of rule ISO_DURATION_TIME may include [123H], etc.

Figure 17:
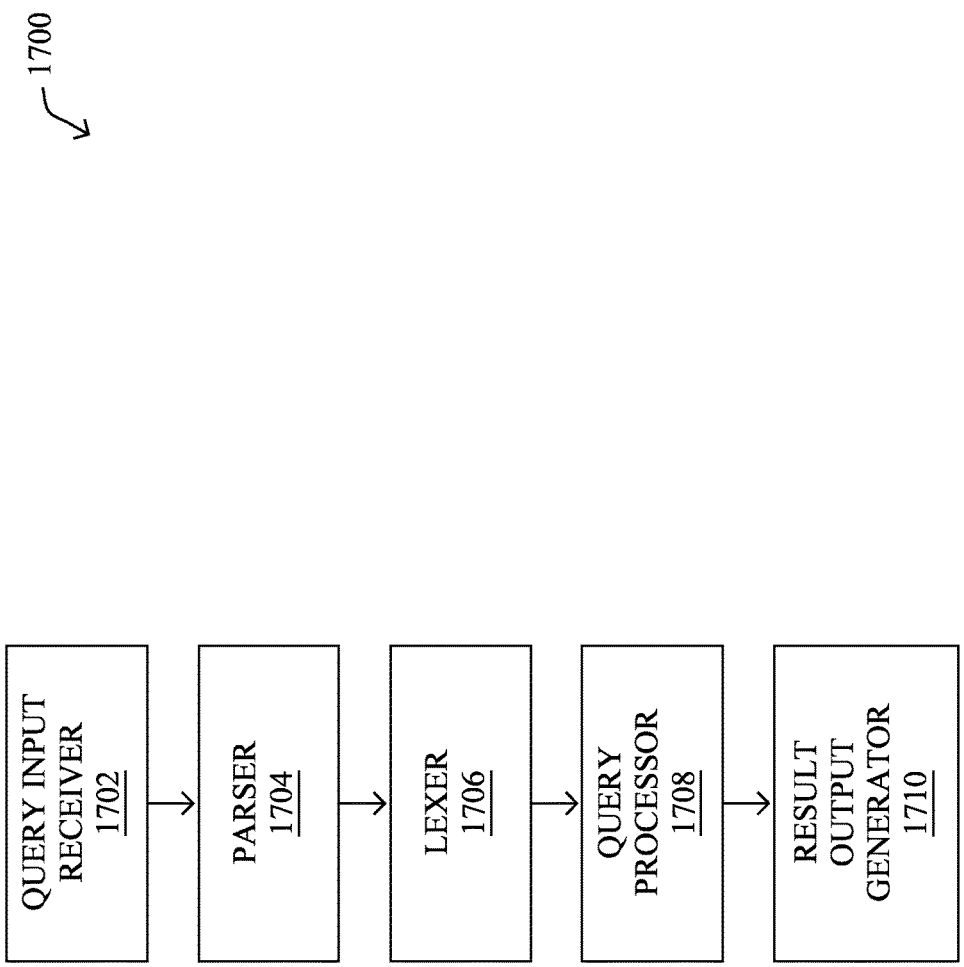
FIG. 17 illustrates an example of a simplified architecture for a graph-based query engine for an extensibility platform.

FIG. 17 illustrates an example of a simplified architecture 1700 for a graph-based query engine for an extensibility platform, in accordance with one or more embodiments described herein. At the core of architecture 1700 are one or more physical and/or logical components for executing extensibility platform process 248. Extensibility platform process 248 may be executed by a device that is associated with collection, storage, communication, analysis, etc. of data in a UQL format (e.g., in association with an extensibility and/or observability intelligence platform and/or a visualization system for visualizing observability data for a computing network and/or service), or another device in communication therewith.

As shown, the components of the architecture 1700 may include query input receiver 1702, parser 1704, lexer 1706, query processor 1708, and/or result output generator 1710. As would be appreciated, the functionalities of these components may be combined or omitted, as desired. In addition, these components may be implemented on a singular device or in a distributed manner, in which case the combination of executing device can be viewed as their own singular device for purposes of extensibility platform process 248.

Query input receiver 1702 may be a component which receives queries as inputs. The queries may be input to query input receiver 1702 by a user. The queries may be formatted according to a UQL specification.

Parser 1704 may be a component which parses the query received by query input receiver 1702. Parsing the query may include interpreting and/or separating out the queried language of the query according to one or more formalized grammar rules, similar to those described above in section 10.0 and/or illustrated in the example 1600 of a formalized grammar rule illustrated in FIG. 16. Many other additional examples are not explicitly shown and/or described for clarity and/or brevity. However, any formalized grammar rules consistent with the concepts described herein may be utilized by Parser 1704 to parse the query.

Lexer 1706 may be a component for lexing the query string received by query input receiver 1702 and/or parsed by parser 1704. For example, lexer 1706 may analyze the characters of the query to transform the query string into a sequence of lexical tokens having assigned meaning according to the previously described formalized grammar rules.

Query processor 1708 may be a component for performing the query input to query input receiver 1702, parsed by parser 1704, and/or lexed by lexer 1706. Performing the query may include searching a collection of data for any data of the type specified in the query as determined by parser 1704 and/or lexer 1706. This may involve communication with data stores and/or reading, writing, etc. operations to the data stores. Query processor 1708 may identify, gather, and/or organize the data satisfying and/or matching the query.

Result output generator 1710 may assemble and/or deliver an output including the data identified, gathered, and/or organized by query processor 1708 to satisfy the query. Result output generator 1710 may deliver the output to a user. The output may include links to, graphical representations of, synopses of, summaries of the data satisfying the query.

Figure 18:
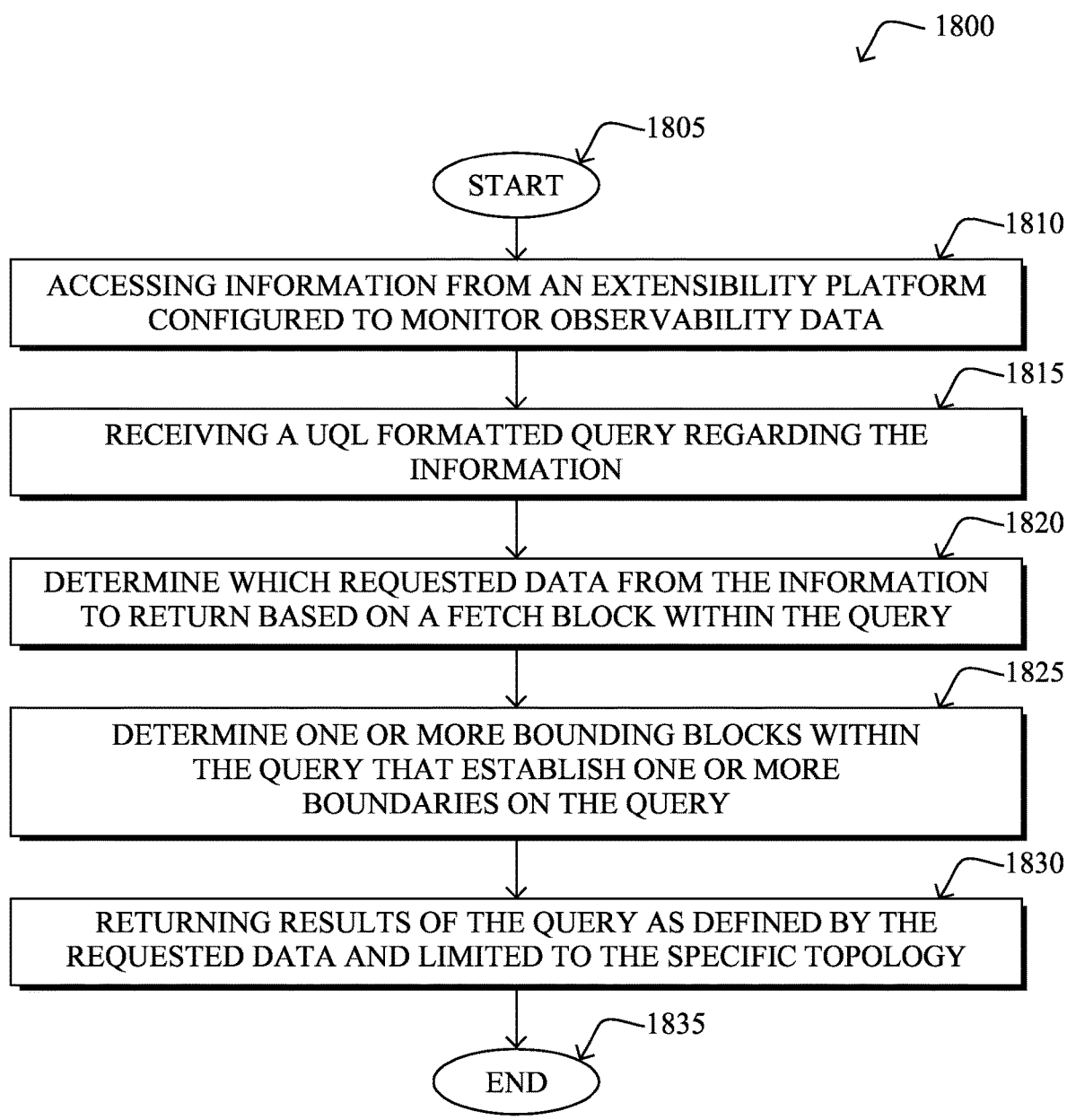
FIG. 18 illustrates an example simplified procedure for utilizing a graph-based query engine for an extensibility platform, in accordance with one or more embodiments described herein.

In closing, FIG. 18 illustrates an example simplified procedure for utilizing a graph-based query engine for an extensibility platform, in accordance with one or more embodiments described herein. For example, a non-generic, specifically configured device (e.g., device 200) may perform procedure 1800 by executing stored instructions (e.g., extensibility platform process 248). The procedure 1800 may start at step 1805, and continues to step 1810, where, as described in greater detail above, a process may include accessing information from an extensibility platform configured to monitor observability data from a monitored computer network topology.

At step 1815, as detailed above, the process may include receiving, from a requesting device, a query regarding the information, the query formatted according to a unified query language for the extensibility platform. In various embodiments, the process may include determining, from the query, one or more object filters. The one or more object filters may be based on one or more of scalar fields, facts, attributes, or tags associated with specified objects selected from entities, metrics, or events.

In further embodiments, the query may further define one or more arithmetic operations to be performed on the information. In such embodiments, the process may further comprise performing the one or more arithmetic operations on the information to generate at least a portion of the results of the query.

As noted above, at step 1820 the process may include determining which specific requested data from the information to return in response to the query based on a fetch block within the query. The fetch block may further define an order of fields for the requested data to return in response to the query.

Further to the description above, at step 1825 the process may include determining one or more bounding blocks (e.g., the non "FETCH" blocks as defined above) within the query that establish one or more boundaries on the query, wherein one of the one or more bounding blocks comprises a topology boundary block (e.g., a "FROM" block as defined above) to define a specific topology of the monitored computer network topology, wherein the specific topology identifies one or more entities within the monitored computer network topology to which the query is specifically directed. The topology boundary block may further define the one or more entities as one or more of: specific entity state information, entity associations, or entity inheritances. The topology boundary block may further define the one or more entities as all entities of a given type. The topology boundary block further defines the one or more entities as a list of unique entity identifications.

In various embodiments, the process may include establishing an alias for the specific topology for use by the one or more bounding blocks within the query. In further embodiments, the process may include joining the alias with one or more additional defined specific topologies, wherein the results of the query are limited to the specific topology of the alias and the one or more additional defined specific topologies.

One of the one or more bounding blocks may comprise a namespace block to define one or more specific types used in the query. In various embodiments, one or more of the one or more bounding blocks comprise one or more time range boundary blocks (e.g., a "SINCE" block as defined above, an "UNTIL" block as defined above, etc.) to define one or more specific time-based boundaries within the information. The one or more time range boundary blocks may be one or both of either a since block to define a starting time boundary or an until block to define an ending time boundary. The one or more specific time-based boundaries may comprise one of either an absolute time or a relative duration. Furthermore, one of the one or more bounding blocks may comprise a limits block to define one or more limits on the results of the query.

At step 1830, as detailed above, the process may include returning, to the requesting device, results of the query as defined by the requested data to return and limited to the specific topology. The results of the query may comprise processed state information based on the observability data.

The query may further define one or more combinatory operations to be performed on the information. The one or more combinatory operations may be selected from a group consisting of: aggregations, groupings, and counts. The process may further include performing the one or more combinatory operations on the information to generate at least a portion of the results of the query.

The simplified procedure 1800 may then end in step 1855, notably with the ability to continue executing additional received queries and/or updating results of the queries based on updates to information of the extensibility platform. Other steps may also be included generally within procedure 1800.

It should be noted that while certain steps within procedure 1800 may be optional as described above, the steps shown in FIG. 18 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce mechanisms for performing graph-based queries of extensibility platforms. These mechanisms leverage interpretation of data structures as graphs of entities, where each entity has properties and relationships to other entities. An activity-specific User Interface may display one subgraph centered around a currently selected set of entities (e.g., the scope). Also, the composition tree of the components may be reflected by one or multiple tree structures embedded in said subgraph. Because that data path is relative and doesn't require knowledge of the absolute definition of information represented by the parent component, these techniques leverage the possibility of dynamically configuring hierarchies of components and then derive the full structure of the subgraph required to render these components from the data paths. Combined with the knowledge of the set of entities bound to the root component (e.g., the scope), this structure can then be translated into an optimized query with no redundant requests, which provides the data required to render the UI. In combination with a backend, providing some form of query language that supports dynamically querying graph structures, new activity specific UIs can be developed by mere configuration without making any changes to frontend or backend code.

Illustratively, the techniques described herein may be performed by hardware, software, and/or firmware, such as in accordance with the illustrative extensibility platform process 248, which may include computer executable instructions executed by the processor 220 to perform functions relating to the techniques described herein, e.g., in conjunction with corresponding processes of other devices in the computer network as described herein (e.g., on network agents, controllers, computing devices, servers, etc.). In addition, the components herein may be implemented on a singular device or in a distributed manner, in which case the combination of executing devices can be viewed as their own singular "device" for purposes of executing the process 248.

According to the embodiments herein, an illustrative method herein may comprise: accessing, by a process, information from an extensibility platform configured to monitor observability data from a monitored computer network topology; receiving, by the process and from a requesting device, a query regarding the information, the query formatted according to a unified query language for the extensibility platform; determining, by the process, which specific requested data from the information to return in response to the query based on a fetch block within the query; determining, by the process, one or more bounding blocks within the query that establish one or more boundaries on the query, wherein one of the one or more bounding blocks comprises a topology boundary block to define a specific topology of the monitored computer network topology, wherein the specific topology identifies one or more entities within the monitored computer network topology to which the query is specifically directed; and returning, from the process and to the requesting device, results of the query as defined by the requested data to return and limited to the specific topology.

In one embodiment, the topology boundary block further defines the one or more entities as one or more of: specific entity state information, entity associations, or entity inheritances. In one embodiment, the topology boundary block further defines the one or more entities as all entities of a given type. In one embodiment, the topology boundary block further defines the one or more entities as a list of unique entity identifications.

In one embodiment, the method further comprises establishing an alias for the specific topology for use by the one or more bounding blocks within the query. In one embodiment, the method further comprises joining the alias with one or more additional defined specific topologies, wherein the results of the query are limited to the specific topology of the alias and the one or more additional defined specific topologies. In one embodiment, the method further comprises determining, from the query, one or more object filters. In one embodiment, the one or more object filters are based on one or more of scalar fields, facts, attributes, or tags associated with specified objects selected from entities, metrics, or events.

In one embodiment, the observability data comprises one or more of metrics, events, logs, or trace data. In one embodiment, the results of the query comprise processed state information based on the observability data. In one embodiment, one of the one or more bounding blocks comprises a namespace block to define one or more specific types used in the query. In one embodiment, one or more of the one or more bounding blocks comprise one or more time range boundary blocks to define one or more specific time-based boundaries within the information. In one embodiment, the one or more time range boundary blocks are one or both of either a since block to define a starting time boundary or an until block to define an ending time boundary. In one embodiment, the one or more specific time-based boundaries comprise one of either an absolute time or a relative duration.

In one embodiment, one of the one or more bounding blocks comprises a limits block to define one or more limits on the results of the query. In one embodiment, the query further defines one or more arithmetic operations to be performed on the information, and the method further comprises performing the one or more arithmetic operations on the information to generate at least a portion of the results of the query. In one embodiment, the query further defines one or more combinatory operations to be performed on the information, the one or more combinatory operations selected from a group consisting of: aggregations, groupings, and counts; wherein the method further comprises: performing the one or more combinatory operations on the information to generate at least a portion of the results of the query. In one embodiment, the fetch block further defines an order of fields for the requested data to return in response to the query.

According to the embodiments herein, an illustrative tangible, non-transitory, computer-readable medium herein may have computer-executable instructions stored thereon that, when executed by a processor on a computer, may cause the computer to perform a method comprising: accessing information from an extensibility platform configured to monitor observability data from a monitored computer network topology; receiving, from a requesting device, a query regarding the information, the query formatted according to a unified query language for the extensibility platform; determining specific requested data from the information to return in response to the query based on a fetch block within the query; determining one or more bounding blocks within the query that establish one or more boundaries on the query, wherein one of the one or more bounding blocks comprises a topology boundary block to define a specific topology of the monitored computer network topology, wherein the specific topology identifies one or more entities within the monitored computer network topology to which the query is specifically directed; and returning, to the requesting device, results of the query as defined by the specific requested data to return and limited to the specific topology.

Further, according to the embodiments herein an illustrative apparatus herein may comprise: one or more network interfaces to communicate with a network; a processor coupled to the network interfaces and configured to execute one or more processes; and a memory configured to store a process that is executable by the processor, the process, when executed, configured to: access information from an extensibility platform configured to monitor observability data from a monitored computer network topology; receive, from a requesting device, a query regarding the information, the query formatted according to a unified query language for the extensibility platform; determine specific requested data from the information to return in response to the query based on a fetch block within the query; determine one or more bounding blocks within the query that establish one or more boundaries on the query, wherein one of the one or more bounding blocks comprises a topology boundary block to define a specific topology of the monitored computer network topology, wherein the specific topology identifies one or more entities within the monitored computer network topology to which the query is specifically directed; and return, to the requesting device, results of the query as defined by the specific requested data to return and limited to the specific topology.

While there have been shown and described illustrative embodiments above, it is to be understood that various other adaptations and modifications may be made within the scope of the embodiments herein. For example, while certain embodiments are described herein with respect to certain types of applications in particular, such as the observability intelligence platform, the techniques are not limited as such and may be used with any computer application, generally, in other embodiments. For example, as opposed to observability and/or telemetry data, particularly as related to computer networks and associated metrics (e.g., pathways, utilizations, etc.), other application platforms may also utilize the general extensibility platform described herein, such as for other types of data-based user interfaces, other types of data ingestion and aggregation, and so on, may also benefit from the extensibility platform described herein.

Moreover, while specific technologies, languages, protocols, and associated devices have been shown, such as Java, TCP, IP, and so on, other suitable technologies, languages, protocols, and associated devices may be used in accordance with the techniques described above. In addition, while certain devices are shown, and with certain functionality being performed on certain devices, other suitable devices and process locations may be used, accordingly. That is, the embodiments have been shown and described herein with relation to specific network configurations (orientations, topologies, protocols, terminology, processing locations, etc.). However, the embodiments in their broader sense are not as limited, and may, in fact, be used with other types of networks, protocols, and configurations.

Moreover, while the present disclosure contains many other specifics, these should not be construed as limitations on the scope of any embodiment or of what may be claimed, but rather as descriptions of features that may be specific to particular embodiments of particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

For instance, while certain aspects of the present disclosure are described in terms of being performed "by a server" or "by a controller" or "by a collection engine", those skilled in the art will appreciate that agents of the observability intelligence platform (e.g., application agents, network agents, language agents, etc.) may be considered to be extensions of the server (or controller/engine) operation, and as such, any process step performed "by a server" need not be limited to local processing on a specific server device, unless otherwise specifically noted as such. Furthermore, while certain aspects are described as being performed "by an agent" or by particular types of agents (e.g., application agents, network agents, endpoint agents, enterprise agents, cloud agents, etc.), the techniques may be generally applied to any suitable software/hardware configuration (libraries, modules, etc.) as part of an apparatus, application, or otherwise.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in the present disclosure should not be understood as requiring such separation in all embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
accessing, by a process, information from an extensibility platform configured to monitor observability data from a monitored computer network topology, wherein the observability data is obtained by a plurality of agents that comprise an observability intelligence platform;
receiving, by the process and from a requesting device, a query regarding the information, the query formatted according to a unified query language for the extensibility platform and comprising a fetch block;
determining, by the process, specific requested data and an order of fields for the specific requested data from the information to return in response to the query based on the fetch block within the query;

determining, by the process, one or more bounding blocks within the query that establish one or more boundaries on the query, wherein one of the one or more bounding blocks comprises a topology boundary block to define a specific topology of the monitored computer network topology, wherein the specific topology identifies one or more entities within the monitored computer network topology to which the query is specifically directed, wherein the topology boundary block further defines the one or more entities including at least one of: specific entity state information, entity associations, entity inheritances, all entities of a given type, a list of unique entity identifications, or by referencing an alias for the specific topology for use by the one or more bounding blocks within the query; and returning, from the process and to the requesting device, results of the query as defined by the specific requested data to return and limited to the specific topology.

2. The method as in claim 1, further comprising:
joining the alias with one or more additional defined specific topologies, wherein the results of the query are limited to the specific topology of the alias and the one or more additional defined specific topologies.

3. The method as in claim 1, further comprising:
determining, from the query, one or more object filters.

4. The method as in claim 3, wherein the one or more object filters are based on one or more of scalar fields, facts, attributes, or tags associated with specified objects selected from entities, metrics, or events.

5. The method as in claim 1, wherein the observability data comprises one or more of metrics, events, logs, or trace data.

6. The method as in claim 1, wherein results of the query comprise processed state information based on the observability data.

7. The method as in claim 1, wherein one of the one or more bounding blocks comprises a namespace block to define one or more specific types used in the query.

8. The method as in claim 1, wherein one or more of the one or more bounding blocks comprise one or more time range boundary blocks to define one or more specific time-based boundaries within the information.

9. The method as in claim 8, wherein the one or more time range boundary blocks are one or both of either a since block to define a starting time boundary or an until block to define an ending time boundary.

10. The method as in claim 8, wherein the one or more specific time-based boundaries comprise one of either an absolute time or a relative duration.

11. The method as in claim 1, wherein one of the one or more bounding blocks comprises a limits block to define one or more limits on the results of the query.

12. The method as in claim 1, wherein the query further defines one or more arithmetic operations to be performed on the information, the method further comprising:
performing the one or more arithmetic operations on the information to generate at least a portion of the results of the query.

13. The method as in claim 1, wherein the query further defines one or more combinatory operations to be performed on the information, the one or more combinatory operations selected from a group consisting of: aggregations, groupings, and counts; wherein the method further comprises:
performing the one or more combinatory operations on the information to generate at least a portion of the results of the query.

14. A tangible, non-transitory, computer-readable medium having computer-executable instructions stored thereon that, when executed by a processor on a computer, cause the computer to perform a method comprising:
accessing information from an extensibility platform configured to monitor observability data from a monitored computer network topology, wherein the observability data is obtained by a plurality of agents that comprise an observability intelligence platform;
receiving, from a requesting device, a query regarding the information, the query formatted according to a unified query language for the extensibility platform and comprising a fetch block;
determining specific requested data and an order of fields for the specific requested data from the information to return in response to the query based on a fetch block within the query;
determining one or more bounding blocks within the query that establish one or more boundaries on the query, wherein one of the one or more bounding blocks comprises a topology boundary block to define a specific topology of the monitored computer network topology, wherein the specific topology identifies one or more entities within the monitored computer network topology to which the query is specifically directed, wherein the topology boundary block further defines the one or more entities including at least one of: specific entity state information, entity associations, entity inheritances, all entities of a given type, a list of unique entity identifications, or by referencing an alias for the specific topology for use by the one or more bounding blocks within the query; and
returning, to the requesting device, results of the query as defined by the specific requested data to return and limited to the specific topology.

15. An apparatus, comprising:
one or more network interfaces to communicate with a network;
a processor coupled to the one or more network interfaces and configured to execute one or more processes; and
a memory configured to store a process that is executable by the processor, the process, when executed, configured to:
access information from an extensibility platform configured to monitor observability data from a monitored computer network topology, wherein the observability data is obtained by a plurality of agents that comprise an observability intelligence platform;
receive, from a requesting device, a query regarding the information, the query formatted according to a unified query language for the extensibility platform and comprising a fetch block;
determine specific requested data and an order of fields for the specific requested data from the information to return in response to the query based on a fetch block within the query;
determine one or more bounding blocks within the query that establish one or more boundaries on the query, wherein one of the one or more bounding blocks comprises a topology boundary block to define a specific topology of the monitored computer network topology, wherein the specific topology identifies one or more entities within the monitored computer network topology to which the query is specifically directed, wherein the topology boundary block further defines the one or more entities including at least one of: specific entity state information, entity associations, entity inheritances, all entities of a given type, a list of unique entity identifications, or by referencing an alias for the specific topology for use by the one or more bounding blocks within the query; and
return, to the requesting device, results of the query as defined by the specific requested data to return and limited to the specific topology.

\* \* \* \* \*